(12) United States Patent
Hashimoto

(10) Patent No.: US 11,551,162 B2
(45) Date of Patent: Jan. 10, 2023

(54) RESOURCE RESERVATION SYSTEM, REGISTRATION TERMINAL, AND SETTING METHOD

(71) Applicant: Takahiro Hashimoto, Kanagawa (JP)

(72) Inventor: Takahiro Hashimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 343 days.

(21) Appl. No.: 16/910,502

(22) Filed: Jun. 24, 2020

(65) Prior Publication Data

US 2020/0410407 A1 Dec. 31, 2020

(30) Foreign Application Priority Data

Jun. 28, 2019 (JP) .............................. JP2019-122465

(51) Int. Cl.
*G06Q 10/02* (2012.01)
*G06F 16/953* (2019.01)
*H04L 67/104* (2022.01)

(52) U.S. Cl.
CPC .......... *G06Q 10/02* (2013.01); *G06F 16/953* (2019.01); *H04L 67/1044* (2013.01)

(58) Field of Classification Search
CPC .... G06Q 10/02; G06F 16/953; H04L 67/1044
See application file for complete search history.

(56) References Cited

U.S. PATENT DOCUMENTS

| | | | |
|---|---|---|---|
| 7,743,120 B2 | 6/2010 | Takagi | |
| 9,465,566 B2 | 10/2016 | Ishino et al. | |
| 10,129,428 B2 | 11/2018 | Matsushima et al. | |
| 2005/0261945 A1* | 11/2005 | Mougin | G08G 1/14 705/5 |
| 2011/0187493 A1* | 8/2011 | Elfstrom | G07C 9/22 340/5.6 |
| 2015/0112738 A1* | 4/2015 | Marinaro | G06Q 10/02 705/5 |

(Continued)

FOREIGN PATENT DOCUMENTS

| | | |
|---|---|---|
| JP | 3919721 | 5/2007 |
| JP | 2016-143140 | 8/2016 |
| JP | 2017-157200 | 9/2017 |

*Primary Examiner* — Thomas J Dailey
(74) *Attorney, Agent, or Firm* — IPUSA, PLLC

(57) ABSTRACT

A resource reservation system includes an information processing apparatus and an information processing terminal. The information processing apparatus includes a memory, and a processor coupled to the memory and configured to transmit reservation information of a resource to the information processing terminal, store a communication setting of the information processing terminal associated with the resource, generate a first web page that displays the communication setting of the information processing terminal and that is displayed by a registration terminal, and receive a change in the communication setting of the information processing terminal. The change in the communication setting is made on the first web page displayed by the registration terminal. The second processor switches whether to transmit the reservation information in accordance with the communication setting of the information processing terminal, in response to a request from the information processing terminal.

8 Claims, 24 Drawing Sheets

(56) References Cited

U.S. PATENT DOCUMENTS

| | | |
|---|---|---|
| 2016/0110659 A1* | 4/2016 | Skeen .................... G06Q 10/02 705/5 |
| 2018/0101793 A1* | 4/2018 | Steinberg ............ G06F 16/9535 |
| 2018/0324310 A1 | 11/2018 | Hashimoto |
| 2019/0012614 A1 | 1/2019 | Yamada et al. |
| 2019/0281092 A1 | 9/2019 | Yamada et al. |
| 2019/0303827 A1 | 10/2019 | Hashimoto |
| 2020/0104760 A1 | 4/2020 | Hashimoto |
| 2020/0104804 A1 | 4/2020 | Fujimura et al. |
| 2020/0160243 A1 | 5/2020 | Tomosugi |
| 2020/0174767 A1 | 6/2020 | Hashimoto |
| 2020/0174825 A1 | 6/2020 | Hayashi |

\* cited by examiner

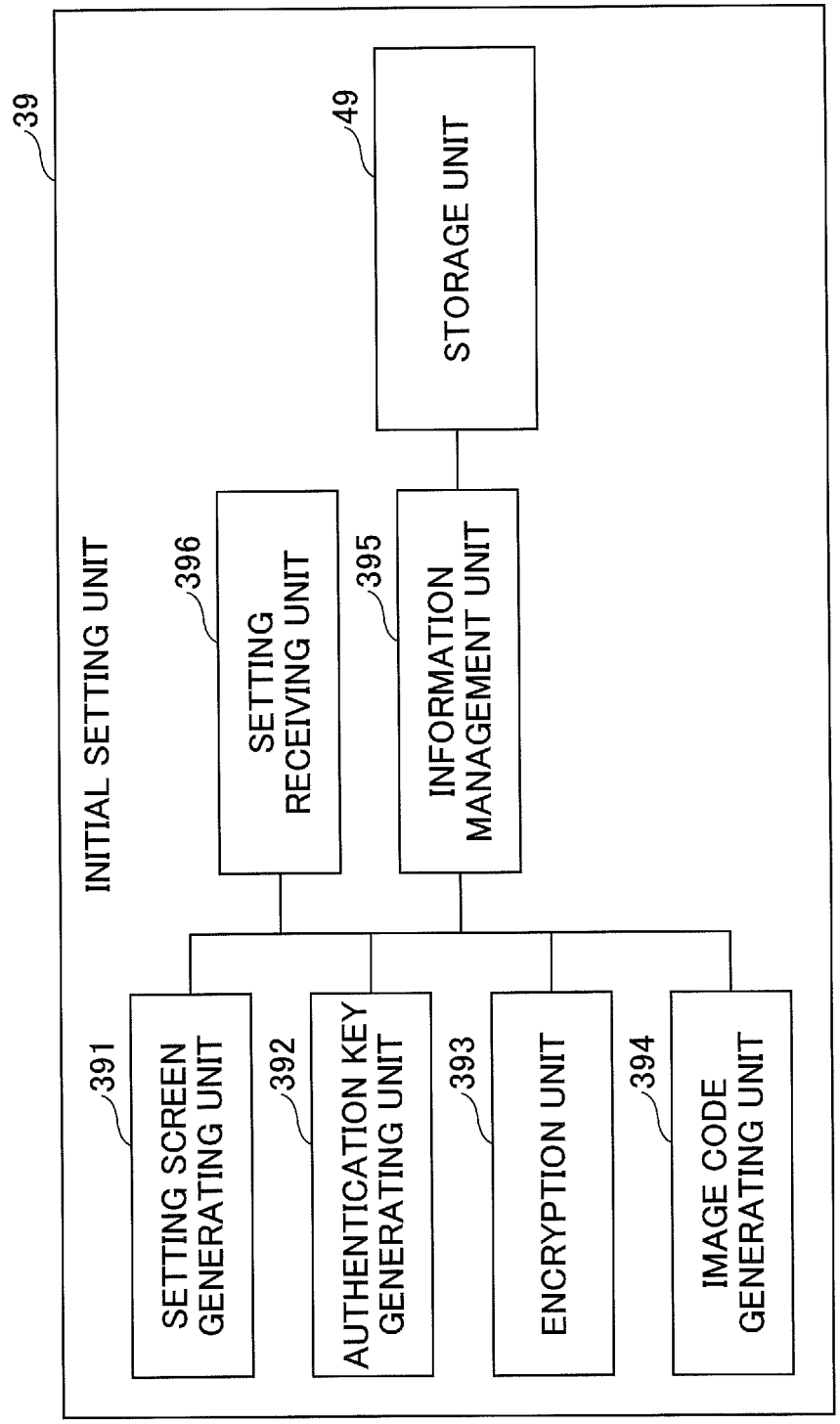

FIG.9A

| | MEETING ROOM NAME | MEETING ROOM ID | OPERATION STATE | IMAGE CODE | EDIT |
|---|---|---|---|---|---|
| ☐ | MEETING ROOM A | K-001 | OPERATING | ▦ | ✏ |
| ☐ | MEETING ROOM B | K-002 | STOPPED | ▦ | ✏ |
| ☐ | MEETING ROOM C | K-003 | OPERATING | ▦ | ✏ |
| ☐ | MEETING ROOM D | K-004 | STOPPED | ▦ | ✏ |
| ☐ | MEETING ROOM E | K-005 | OPERATING | ▦ | ✏ |

MANAGE MEETING ROOMS

LIST OF INSTALLED TERMINALS

FIG.9B

| OPERATION STATE | |
|---|---|
| STOPPED | ▽ |
| OPERATING | |
| TEST OPERATION | |

FIG.10A

| | MEETING ROOM NAME | TERMINAL ID | CONNECTION STATE | LAST ACCESSED TIME | EDIT |
|---|---|---|---|---|---|
| ☐ | MEETING ROOM A | AAAAA | CONNECTED | 2019/05/15 16:10:04 | ✎ |
| ☐ | MEETING ROOM B | BBBBB | CONNECTED | 2019/05/15 16:10:12 | ✎ |
| ☐ | MEETING ROOM C | CCCCC | DISCON-NECTED | 2019/05/15 14:30:45 | ✎ |
| ☐ | MEETING ROOM D | DDDDD | CONNECTED | 2019/05/15 16:10:22 | ✎ |
| ☐ | MEETING ROOM E | EEEEE | AFTER SETUP | 2019/03/15 10:05:02 | ✎ |

508 MANAGE MEETING ROOMS
509 LIST OF INSTALLED TERMINALS 620, 621, 622, 623, 624, 625, 626

FIG.10B

| AFTER SETUP ▽ |
|---|
| CONNECTION REFUSED |
| DELETE |

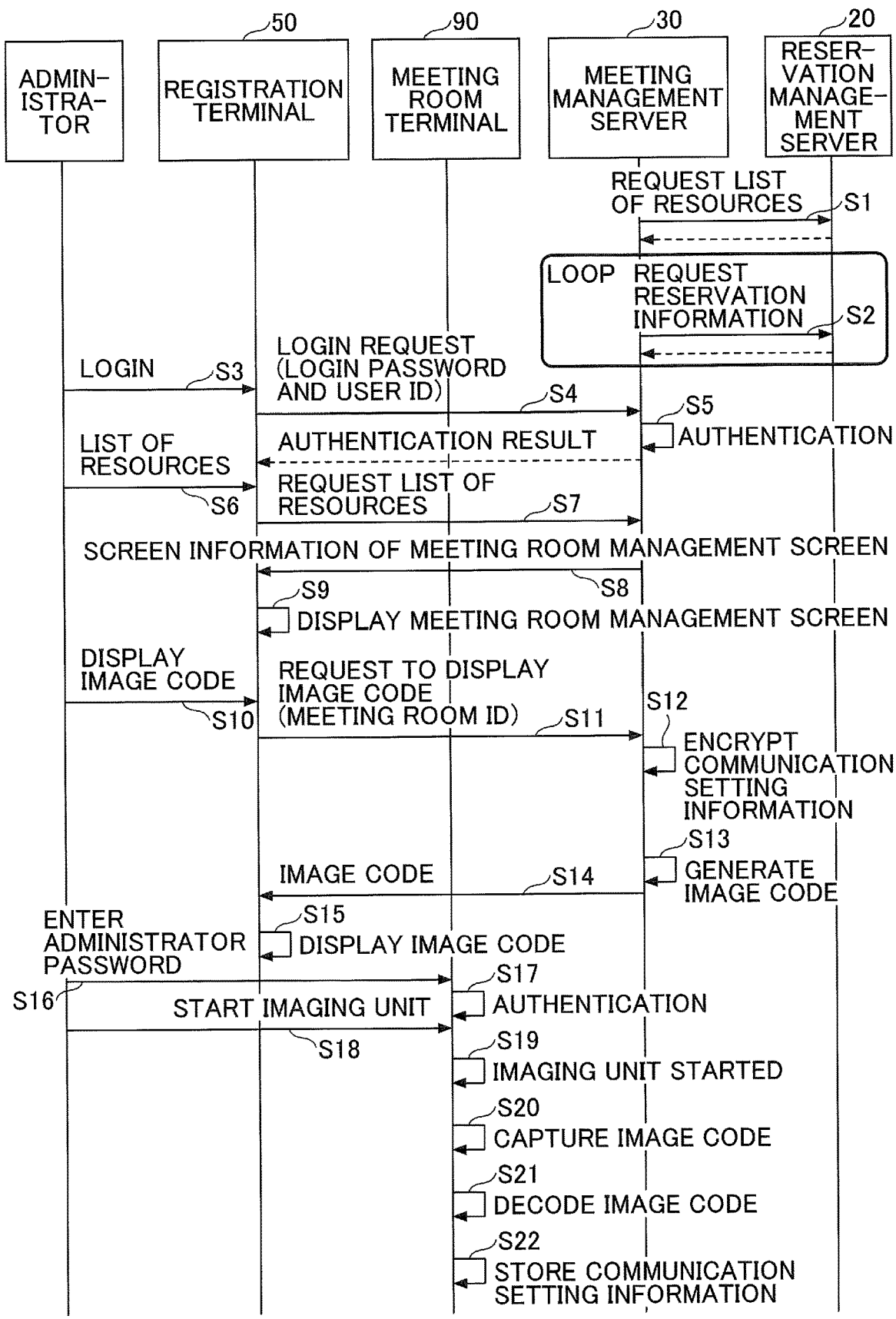

RESOURCE RESERVATION SYSTEM, REGISTRATION TERMINAL, AND SETTING METHOD

CROSS-REFERENCE TO RELATED APPLICATIONS

The present application claims priority under 35 U.S.C. § 119 to Japanese Patent Application No. 2019-122465, filed on Jun. 28, 2019, the entire contents of which are incorporated herein by reference.

BACKGROUND OF THE INVENTION

1. Field of the Invention

The disclosures herein relate to a resource reservation system, a registration terminal, and a setting method.

2. Description of the Related Art

There may be cases where an operator registers an information processing terminal in an information processing apparatus on a network. For example, when the information processing terminal is a printing apparatus, an operator may register the printing apparatus in an information processing apparatus in order to allow the information processing apparatus to monitor the status of the printing apparatus and the remaining amount of supplies.

A technology for reducing the burden on such a job is known (see Patent Document 1, for example). Patent Document 1 describes a registration method in which a mobile terminal reads a code printed on a packaging box of a relay device and communicates with an information processing apparatus, and the information processing apparatus registers the relay device when authentication is successful.

However, in the related-art registration method, it is not easy for an administrator to change communication settings for an information processing terminal installed in a resource such as a meeting room. For example, a plurality of information processing terminals may be installed in a meeting room in order to continuously provide a service even if one information processing terminal malfunctions. In such a case, it may be desirable to change communication settings for the malfunctioning information processing terminal to be disconnected from an information processing apparatus. Alternatively, if an information processing terminal is lost, there may be a possibility of information leakage because the information processing terminal can receive information from the information processing apparatus and display the received information. In such a case, it may be desirable to change communication settings for the information processing terminal to be disconnected from the information processing apparatus.

RELATED-ART DOCUMENTS

Patent Documents

Patent Document 1: Japanese Unexamined Patent Application Publication No. 2016-143140

SUMMARY OF THE INVENTION

It is a general object of the described embodiments to provide a resource reservation system in which an administrator can change communication settings for an information processing terminal installed in a resource such as a meeting room.

In one embodiment, a resource reservation system includes an information processing apparatus configured to manage reservation information of a resource; and an information processing terminal configured to acquire the reservation information from the information processing apparatus. The information processing terminal includes a first memory, and a first processor coupled to the first memory and configured to transmit a request for the reservation information of the resource to the information processing apparatus, and display the reservation information received from the information processing apparatus. The information processing apparatus includes a second memory, and a second processor coupled to the second memory and configured to transmit the reservation information of the resource to the information processing terminal, in response to the request from the information processing terminal, store, in the second memory, a communication setting of the information processing terminal with respect to the information processing apparatus, the information processing terminal being associated with the resource, generate a first web page that displays the communication setting of the information processing terminal, the first web page being displayed by a registration terminal, and receive a change in the communication setting of the information processing terminal, the change in the communication setting being made on the first web page displayed by the registration terminal. The second processor switches whether to transmit the reservation information in accordance with the communication setting of the information processing terminal, in response to the request from the information processing terminal.

BRIEF DESCRIPTION OF THE DRAWINGS

FIG. 8 is a functional block diagram illustrating functions of an initial setting unit;

FIGS. 9A and 9B are diagrams illustrating examples of a meeting room management screen and a pull-down menu displayed by the registration terminal;

FIGS. 10A and 10B are diagrams illustrating examples of an installed terminals list screen and a pull-down menu displayed by the registration terminal;

FIG. 14 is a sequence diagram illustrating an example of a procedure for configuring the initial settings for the meeting room terminal;

DESCRIPTION OF THE EMBODIMENTS

According to an embodiment of the present invention, it is possible to provide a resource reservation system in which an administrator can change communication settings for an information processing terminal installed in a resource such as a meeting room.

In the following, a resource reservation system and a setting method performed by the resource reservation system according to embodiments will be described with reference to the accompanying drawings.

In the resource reservation system according to an embodiment of the present disclosure, an administrator operates a registration terminal to communicate with a meeting management server, and changes communication settings for an information processing terminal through a user interface (web page) provided by the meeting management server.

In the following, a method for associating an information processing terminal with a resource such as a meeting room will also be described, along with a description of changing communication settings for the information processing terminal.

<Overview of Resource Reservation System>

Figure 1:
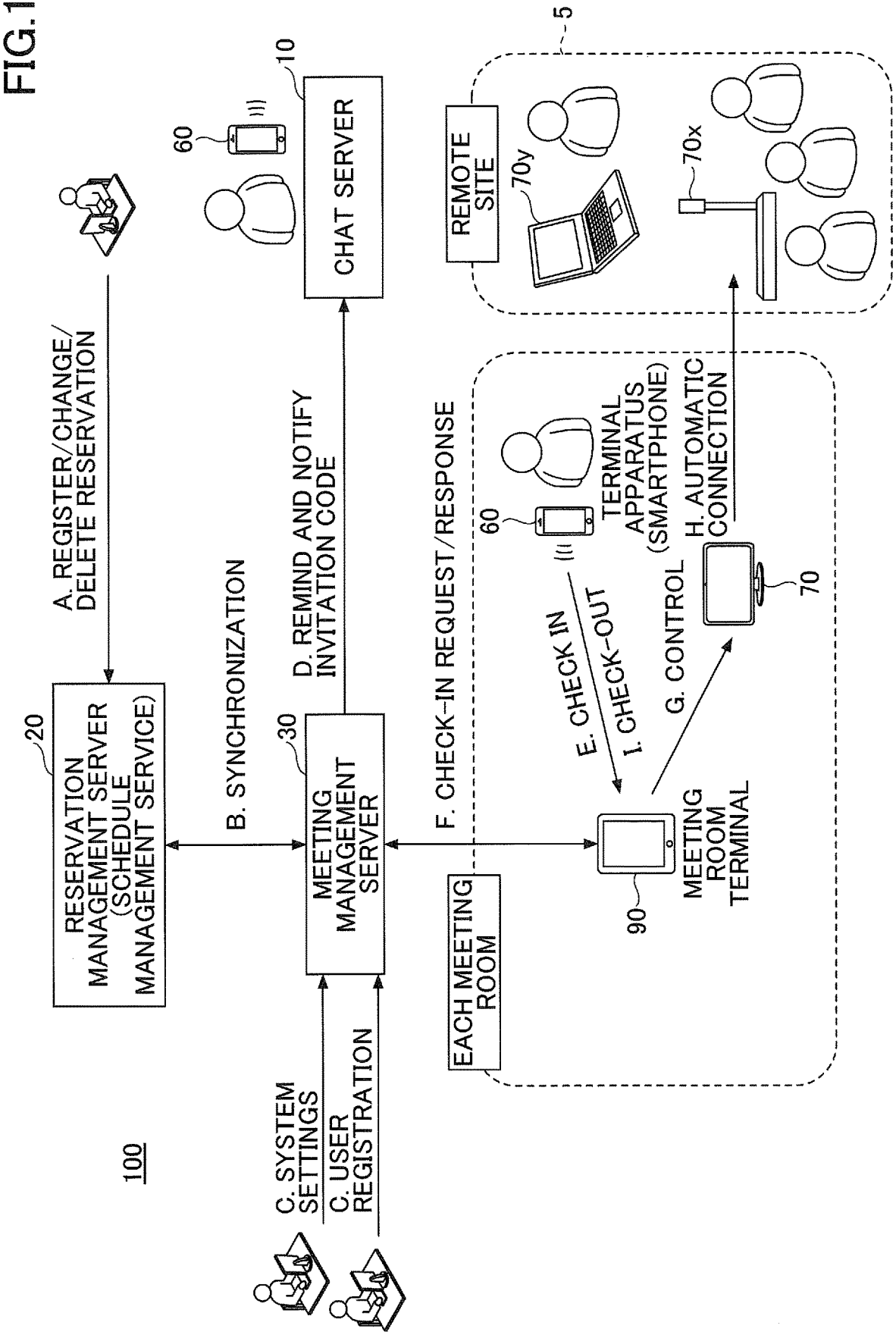
FIG. 1 is a diagram illustrating the overview of the operation of a resource reservation system.

First, the overview of a resource reservation system 100 will be described with reference to FIG. 1. FIG. 1 is a diagram illustrating the overview of the operation of the resource reservation system 100.

A. A user, who is to make a reservation, operates his/her terminal apparatus 60 to communicate with a reservation management server 20 and reserve a meeting room. The reservation management server 20 is a general-purpose cloud service (such as Office 365 (registered trademark) or G Suite (registered trademark)). In the reservation management server 20, meeting rooms of an organization such as a company to which the user who made the reservation belongs are registered.

B. A meeting management server 30 is a server that controls the entire resource reservation system 100 based on the reservation status of a meeting room. The meeting management server 30 communicates with the reservation management server 20 as appropriate to acquire reservation information. Thus, the reservation information is synchronized with the reservation management server 20.

C. The resource reservation system 100 or an administrator on the organization side can register users and perform various settings for the meeting management server 30. User registration means the registration of a user who is notified using a chat server 10 (such as slack, Line, or Microsoft Teams, which are all registered trademarks). In addition, since the notification is made via a bot that transmits a message as the meeting management server 30, the bot provided by the chat server is also registered. Examples of the various settings include the registration (initial settings as will be described below) of a meeting room terminal 90 and timing settings for reminders.

D. When the current time is a predetermined time before the start time of a meeting defined in reservation information, the meeting management server 30 sends a reminder of the scheduled meeting to the user who made the reservation. Accordingly, it is possible to reduce the number of meeting rooms that have been reserved but are not actually used. In addition, the meeting management server 30 notifies the user of an invitation code as necessary. In response to receiving the reminder, the user who made the reservation stores information (meeting identification information) for checking in a meeting room in the terminal apparatus 60. The "check-in" refers to the start of use of a meeting room.

E. In each meeting room, a meeting room terminal 90 is provided, and the meeting room terminal 90 regularly downloads reservation information for a meeting held in a corresponding meeting room. The meeting room terminal 90 can display a schedule of a meeting on that day or a most recent meeting, and allow a meeting participant to check the schedule. Shortly before the start time of the meeting, the user who made the reservation enters the corresponding meeting room and checks in. For example, meeting identification information is input into the meeting room terminal 90, or the terminal apparatus 60 is held over the meeting room terminal 90 (such that the meeting identification information is read or communicated).

F. The meeting room terminal 90 transmits a check-in request to the meeting management server 30. Thus, when the meeting identification information is authenticated, the meeting room terminal 90 receives a response, from the meeting management server 30, indicating that the check-in has been completed. The meeting room terminal 90 displays that the meeting room is in use (the meeting is being held). If the check-in is not confirmed by a predetermined time before the start time of the meeting, the meeting management server 30 cancels the reservation of the meeting room (cancels the reservation information when the use of the meeting room is not started by the predetermined time), and indicates the cancellation of the meeting room to the meeting room terminal 90 as a status included in the reservation information. In this case, the meeting room terminal 90 displays that the meeting room is vacant, and thus any user can use the meeting room.

G. The meeting room terminal 90 controls an electronic device 70 in response to a request from the meeting management server 30. For example, the electronic device 70 is turned on at the start time of the meeting and turned off at the end time of the meeting. In this way, the operation of the electronic device 70 by a meeting participant can be facilitated.

H. If the electronic device 70 includes a teleconference function, for example, the electronic device 70 can communicate with an electronic device (such as a teleconference terminal 70x) at a remote site 5 and have the meeting with the remote site. A personal computer (PC) 70y, on which an application runs, can also communicate with the electronic device 70. Destination information (a communication ID of a destination) indicating the remote site 5 is included in the reservation information in advance, and the electronic device 70 can automatically communicate with the teleconference terminal 70x and the PC 70y.

I. When the user who made the reservation ends the meeting, the user presses a button on the meeting room terminal 90 to check out. The meeting room terminal 90 displays the next reservation status, thereby allowing any user to check the reservation status of the meeting room.

<Initial Settings for Meeting Room Terminal>

In the resource reservation system 100 in which a dedicated meeting room terminal 90 is provided in each meeting room as illustrated in FIG. 1, the initial settings for the meeting room terminal 90 are configured at the time of shipment. Therefore, no initial settings are required or only the minimum settings are required by the administrator. However, if the dedicated meeting room terminal 90 is used, a general-purpose information processing terminal is unable to be used, instead of the dedicated meeting room terminal 90.

Recently, the bring your own device (BYOD) approach has been adopted. By allowing users to use their own smart devices as meeting room terminals 90, the resource reservation system 100 can be implemented at low costs. However, in this case, the users are required to configure the initial settings such as registering their own smart devices in the meeting management server 30 as meeting room terminals 90. If the initial settings are complicated, the burdens on the users would increase.

In light of the above, in the following embodiments, the resource reservation system 100, in which a meeting room terminal 90 captures image data such as an image code (e.g., a QR code (registered trademark)) to complete the initial settings, will be described. Note that the meeting room terminal 90 is the same as an information processing terminal. The terminal before the initial settings is referred to as the information processing terminal, and the terminal after the initial settings is referred to as the meeting room terminal 90. Even if the meeting room terminal 90 is a dedicated terminal, the present invention can be applied, as long as the dedicated terminal requires communication settings with a server after the shipment or after the initial settings.

Figure 2:
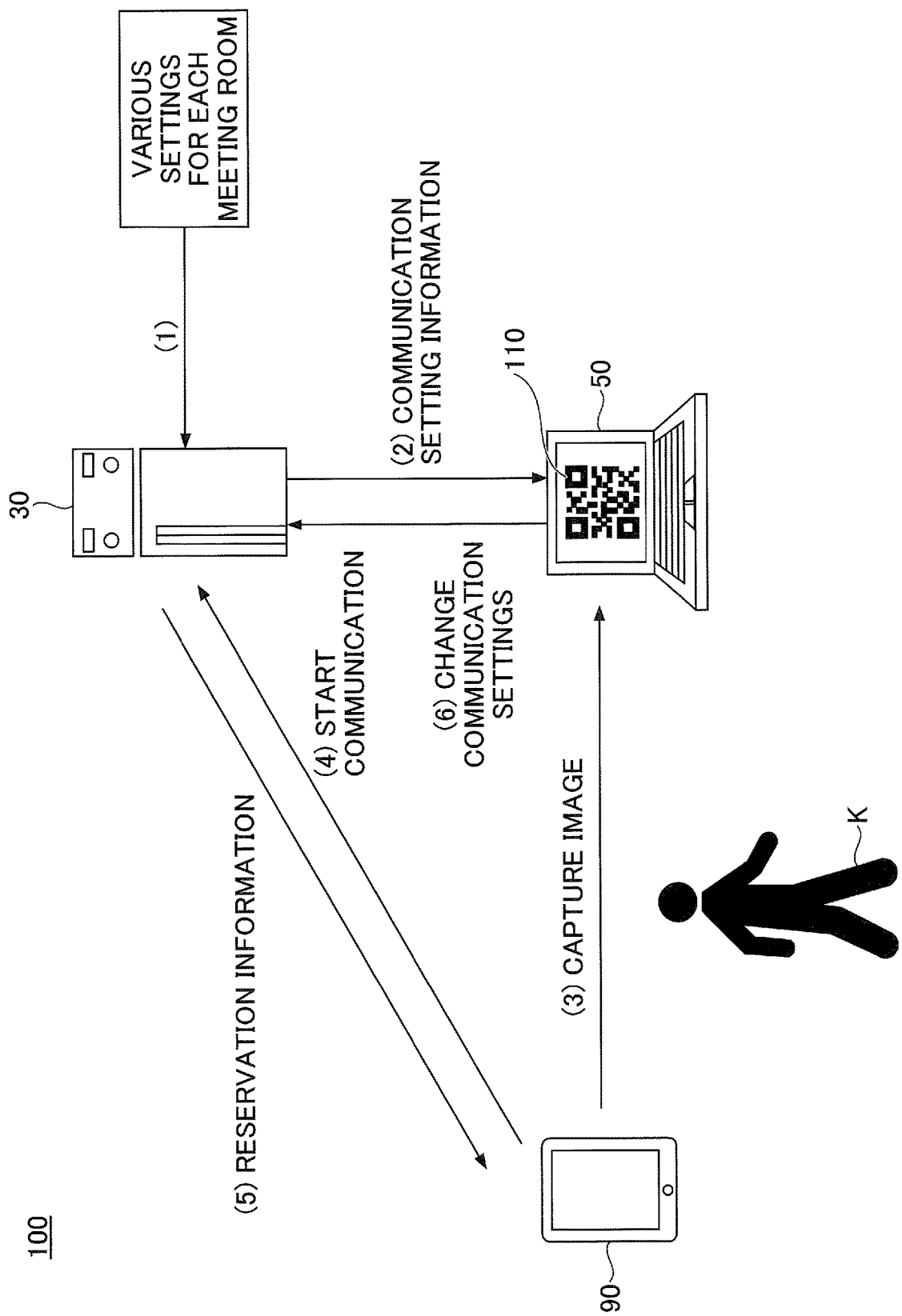
FIG. 2 is a diagram illustrating the overview of the initial settings for a meeting room terminal using a two-dimensional code.

FIG. 2 is a diagram illustrating the overview of the initial settings for the meeting room terminal 90 using an image code.

(1) A provider of the resource reservation system 100 configures various settings related to meeting rooms of a customer in advance. The customer refers to a company that adopts the resource reservation system 100. The various settings include meeting room names, meeting room IDs, and a URL of the meeting management server 30. Further, the meeting management server 30 includes reservation information synchronized with the reservation management server 20 for each meeting room.

(2) An administrator K configures the initial settings for an information processing terminal to use the information processing terminal as a meeting room terminal 90. The initial settings may include several settings, and at least includes allowing the meeting room terminal 90 to communicate with the meeting management server 30. It is preferable to perform communication by designating a meeting room. Therefore, the initial settings also include associating the meeting room terminal 90 with a meeting room where the meeting room terminal 90 is installed, and registering the meeting room terminal 90 in the meeting management server 30. The administrator K who configure the initial settings may be a person in charge on the provider side or a system engineer on the customer side.

The administrator K uses a registration terminal 50 to log in to and communicate with the meeting management server 30. The administrator K may work at any location where the registration terminal 50 can communicate with the meeting management server 30. Therefore, the administrator K is not required to be in the meeting room. The administrator K displays an administrator screen on which to configure the various settings. The administrator K specifies the meeting room with which the meeting room terminal 90 is associated, and requests the meeting management server 30 to send communication setting information. The registration terminal 50 receives the communication setting information. The communication setting information is encoded into an image code.

(3) The administrator K uses the meeting room terminal 90 to capture an image code 110 displayed on the registration terminal 50. A terminal application is installed on the meeting room terminal 90, and the meeting room terminal 90 decodes the image code 110 to acquire the communication setting information. In this manner, the meeting room terminal 90 can start to communicate with the meeting management server 30, and a meeting room ID is set for the meeting room terminal 90. That is, the meeting room terminal 90 is registered in the meeting management server 30 in association with the meeting room where the meeting room terminal 90 is installed, and.

(4) The meeting room terminal 90 uses the communication setting information to start communicating with the meeting management server 30. The meeting room terminal 90 periodically acquires reservation information. The meeting room terminal 90 repeatedly acquires the reservation information, regardless of the state of the meeting management server 30.

(5) The meeting room terminal 90 transmits the set meeting room ID to the meeting management server 30. Therefore, the meeting management server 30 transmits the reservation information associated with the meeting room ID to the meeting room terminal 90. The meeting room terminal 90 displays the reservation information.

(6) The administrator K can change communication settings for the meeting room terminal 90 associated with the meeting room. Although details will be described later, the administrator K can allow the meeting management server 30 to refuse a request for the reservation information, or delete the meeting room terminal 90 associated with the meeting room (namely delete the association between the meeting room terminal 90 and the meeting room).

As described above, in the resource reservation system 100 according to the present embodiment, the customer's own information processing terminal can be used as the meeting room terminal 90. Further, communication settings for the meeting room terminal 90 associated with the meeting room can be changed.

<Terms>

The term "resource" as used herein refers to a resource such as a meeting room, or equipment, a device, a person (receptionist), or a mechanism that can be used in the meeting room. From among the resources, a resource that is difficult to be moved is referred to as a "facility". In the present embodiment, for convenience of description, the term "meeting room" is used as an example of the resource.

The term "initial settings" as used herein refers to any settings configured by a person to allow a device to provide at least minimum functions. For example, the initial settings may include communication settings. Information required for communication is set at the time of initial settings.

A user who makes a reservation is a user who reserves a meeting room. Participants are people who participate in a meeting. The user who made the reservation is often included in participants, but is not necessarily included in the participants. In the present embodiment, work performed by the user who made the reservation may be performed by a participant. All persons who use the meeting room are simply referred to as users.

In order for the meeting room terminal 90 to start to communicate with the meeting management server 30, the administrator is required to configure the initial settings and store the communication setting information in the meeting room terminal 90. Then, the meeting room terminal 90 starts to request the reservation information periodically. However, whether the meeting room terminal 90 can acquire the requested reservation information depends on the settings for the meeting management server 30.

When the operation state is set to "operating", which will be described later, the meeting management server 30 becomes ready to manage the meeting room. In response to receiving a request for the reservation information from the meeting room terminal 90 with the operation state being set to "operating", the meeting management server 30 starts to manage the meeting room. In this manner, the meeting management server 30 starts to transmit the reservation information to the meeting room terminal 90 in response to receiving a request for the reservation information.

The meeting room terminal 90 starts to work with the meeting management server 30 in response to acquiring the reservation information from the meeting management server 30. Accordingly, the meeting management server 30 starts to manage the meeting room in response to receiving the request, and the meeting room terminal 90 starts to work with the meeting management server 30 in response to receiving the reservation information.

When the meeting room terminal 90 starts to work with the meeting management server 30 or the meeting management server 30 starts management, the following processes are performed.

Displaying reservation information (such as a check-in, a check-out, extension, and "use now")

Controlling an electronic device associated with a check-in and a check-out

Automatic cancellation of a reservation

Note that the above-described processes may be collectively referred to as a meeting room management service.

The term "extension" refers to extending the reservation beyond the end time of the reservation of the meeting room. The term "use now" refers to using a vacant meeting room by any user without a reservation.

<Example of System Configuration>

Figure 3:
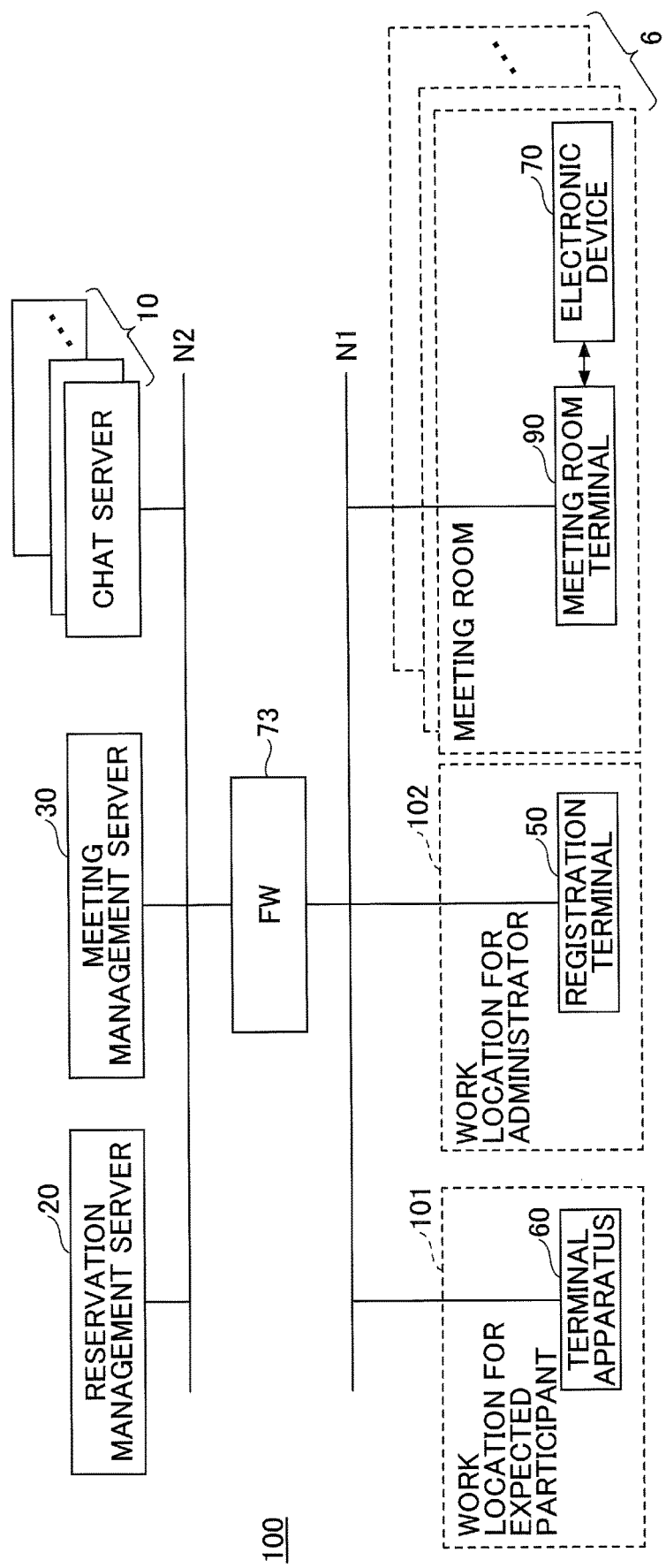
FIG. 3 is a diagram illustrating an example of a system configuration of the resource reservation system.

FIG. 3 is a diagram illustrating an example of a system configuration of the resource reservation system 100. The resource reservation system 100 can be mainly divided into an external network N2 and an internal network N1. The internal network N1 refers to a network inside a firewall 73. The external network N2 is a network such as the Internet, through which an unspecified number of communications are transmitted.

The reservation management server 20, the meeting management server 30, and a chat server 10 are communicably connected to the external network N2. Further, the terminal apparatus 60 operated by a meeting participant may be connected to the external network N2 as necessary.

The reservation management server 20 is implemented by one or more information processing apparatuses (computer systems) each including a general-purpose server operating system (OS). A system for reservations for facilities provided by the reservation management server 20 is referred to as a reservation management system. The reservation management server 20 includes a calendar system and provides a web application that manages various schedules. Specifically, the web application provides the following functions.

Receiving schedule registration, and allowing a user who made a reservation to confirm the reservation anywhere at any time;

Sending a notification by email at a set date and time, such as 30 minutes before the schedule;

Allowing one person to manage schedules with multiple calendars (for business, for private, and the like);

Sharing calendars with people in the same group

The reservation management server 20 manages a user with an account. The account is the right that the user uses a service. In many systems, the user uses the account to log in to the systems. For this reason, the account includes a function (identification information function) that allows the systems to uniquely identify the user. In the present embodiment, the reservation management server 20 transmits reservation information of a preregistered account (domain) to the meeting management server 30. Alternatively, the meeting management server 30 can request reservation information by specifying the account of the reservation management server 20, thereby acquiring the reservation information of a meeting room 6 from the reservation management server 20. Note that the account may be any information that can uniquely identify the user, such as an email, an ID, or a telephone number.

In the present embodiment, reservations for meeting rooms 6 are managed as schedules; however, the present embodiment is not limited thereto, and the reservation management server 20 can manage various schedules. In addition to the meeting rooms 6, the reservation management server 20 can be used to reserve various facilities, such as various rental electronic devices, parking lots, rental offices, rental studios, rental cycles, rental cars, accommodation facilities such as hotels, and rental spaces such event venues and lockers.

Examples of the reservation management server 20 include G Suite (registered trademark) and Office 365 (registered trademark). However, any reservation management system including the functions described in the present embodiment may be used.

In addition, in the present embodiment, information on the meeting rooms 6 within the internal network N1 is preregistered in the reservation management server 20. That is, the web application of the reservation management server 20 is customized according to the meeting room name, the meeting room ID, the available reservation time, the capacity, and the reservation unit of each of the meeting rooms 6 in the internal network of the company that uses the resource reservation system 100. Therefore, reservation information is associated with a corresponding meeting room 6 of the company that uses the resource reservation system 100.

The chat server 10 may be implemented by one or more information processing apparatuses (computer systems) each including a general-purpose server OS. A real-time system that shares information such as text, voice, and video of a plurality of users provided by the chat server 10 is referred to as a chat system. The chat server 10 indicates information related to a meeting room 6 to the terminal apparatus 60. In the present embodiment, a plurality of chat servers 10 operated by different entities may be included.

The information shared in the chat system is not limited to texts, and includes images and voices. In the present embodiment, for convenience of description, it is assumed that a text is mainly used for notification. For example, the chat system may provide a voice call function between groups. A voice call may be a one-to-one voice call or a one-to-N voice call (N≥2). Therefore, in the present embodiment, the chat system may indicate information related to a meeting room 6 by outputting a voice message, instead of displaying a text. Examples of the chat system include LINE (registered trademark), Slack (registered trademark), and Microsoft Teams (registered trademark; hereinafter omitted). However, any chat system that can notify one or more users using a bot (a program that executes a predetermined process) may be used.

The chat server 10 also manages a user with an account (that is different from the account of the reservation management server 20). The meeting management server 30 basically does not need to recognize the account of the chat server 10. However, the meeting management server 30 can specify an account of the chat server 10 to send a notification.

The meeting management server 30 may be implemented by one or more information processing apparatuses (computer systems) each including a general-purpose server OS. As a process relating to the external network N2, the meeting management server 30 acquires reservation information of each of the meeting rooms 6 from the reservation management server 20. Further, the meeting management server 30 acquires expected participants set in the reservation information, and transmits a notification to a group (or an individual user such as a user who made a reservation), in the chat server 10, associated with the acquired expected participants at a preset time. In addition, as a process relating to the internal network N1, a check-in to and a check-out from each of the meeting rooms 6 are managed, and a power supply of the electronic device 70 is controlled on the basis of the reservation information of each of the meeting room 6 acquired from the reservation management server 20.

The meeting rooms 6, a work location 101 for expected participants, and a work location 102 for an administrator are located in the internal network N1. The expected participants can access the external network N2 from various sites via the internal network N1. For example, the internal network N1 may be a local area network (LAN). Note that the meeting rooms 6, the work location 101 for the expected participants, and the work location 102 for the administrator are not necessarily located in a LAN in the same company.

A meeting room terminal 90 and an electronic device 70 are installed in a corresponding meeting room 6. The meeting room terminal 90 and the electronic device 70 may communicate with each other via a small LAN or a dedicated line. The electronic device 70 may be connected to the internal network N1 and the external network N2 without going through the meeting room terminal 90. The meeting room terminal 90 and the electronic device 70 may communicate with each other in a wireless manner or in a wired manner. Because the internal network N1 is located inside the firewall 73, direct communication from the external network N2 to the internal network N1 is difficult.

The meeting room terminal 90 is an information processing apparatus (a facility terminal) operated by a meeting participant such as the user who reserved the meeting room 6. For example, the meeting room terminal 90 may be provided on a desk in the meeting room 6 or provided at an entrance of the meeting room 6. A plurality of meeting room terminals 90 may be provided in the one meeting room 6. The meeting room terminal 90 is implemented by one or more information processing apparatuses (computer systems) each including a general-purpose OS.

For example, the meeting room terminal 90 transmits the meeting room ID to the meeting management server 30, and displays reservation information of the meeting room 6 on that day. In addition, the meeting room terminal 90 acquires control information such as turning on or off of the electronic device 70 from the meeting management server 30. The meeting room terminal 90 turns on or off the electronic device 70 using the acquired control information.

The meeting room terminal 90 displays a standby screen for check-in and check-out. Further, the meeting room terminal 90 communicates with the meeting management server 30 and indicates a check-in and a check-out to the meeting management server 30. At check-in, the meeting room terminal 90 transmits, to the meeting management server 30, meeting identification information that is input by a user who made a reservation together with a meeting room ID that is set for the meeting room terminal 90. Based on the meeting identification information and the meeting room ID transmitted from the meeting room terminal 90, the meeting management server 30 can confirm that the user who made the reservation for the meeting room 6 uses the reserved meeting room 6.

The electronic device 70 may be any type of office equipment that can be used in the meeting room 6. Examples of the electronic device 70 include an electronic whiteboard, a multifunction peripheral, a projector, digital signage, and a digital camera. The electronic whiteboard includes a large-sized display with a touch panel, detects the coordinates of a position on the panel indicated by the user, and connects the coordinates to display a stroke. In addition, the electronic whiteboard can display an image of a connected PC and communicate with another electronic whiteboard at a remote site to synchronize the stroke. The electronic whiteboard may be sometimes referred to as an electronic information board or an electronic blackboard.

The multifunction peripheral includes functions such as a copier, a scanner, a printer, and facsimile transmission/reception, and is used to print materials, copy materials, digitize materials, and transmit materials during a meeting. The projector is an apparatus that projects images. For example, the terminal apparatus 60 projects an image onto a screen, thereby allowing participants to share the projected image. The digital signage is a large display and is used to display any still image or video. The digital camera is used by each participant to capture and store a paper material and a material displayed on the electronic whiteboard.

The terminal apparatus 60 that can be connected to the internal network N1 is installed in the work location 101 for an expected participant. The terminal apparatus 60 may perform wired communication or wireless communication. The terminal apparatus 60 is an information processing apparatus used by an expected participant (such as a user who makes a reservation) to reserve a meeting room. However, it is also assumed that the expected participant may bring the terminal apparatus 60 to the meeting room. In this case, the terminal apparatus 60 is an information processing apparatus carried by the expected participant.

The terminal apparatus 60 may be implemented by one or more information processing apparatuses (computer systems) each including a general-purpose OS. For example, the terminal apparatus 60 may be a smartphone, a tablet terminal, a personal computer (PC), a personal digital assistant (PDA), or a wearable device (eyeglasses type, wristwatch type, or the like). However, the terminal apparatus 60 may be any apparatus on which browser software having a communication function or application software dedicated to the chat server 10 or the reservation management server 20 can operate. For example, the terminal apparatus 60 may be a car navigation, a game console, or a television receiver.

Application software dedicated to the chat server 10 (hereinafter referred to as a chat application) operates on the terminal apparatus 60, and also application software dedicated to the resource reservation system 100 (hereinafter referred to as a meeting application) operates on the terminal apparatus 60. The above application software may be substituted with browser software.

The registration terminal 50 that can be connected to the internal network N1 is installed in the work location 102 for the administrator. The registration terminal 50 may perform wired communication or wireless communication. The registration terminal 50 is a terminal used by the administrator to configure the initial settings for the meeting room terminal 90.

The registration terminal 50 may be an information processing apparatus similar to the terminal apparatus 60. However, because the registration terminal 50 is mainly used by the administrator to configure settings for the meeting room terminal 90, the registration terminal 50 is not required to use the chat application and the meeting application. The registration terminal 50 mainly uses browser software to communicate with the meeting management server 30.

<Hardware Configuration>
<<Hardware Configuration of Meeting Management Server>>

Figure 4:
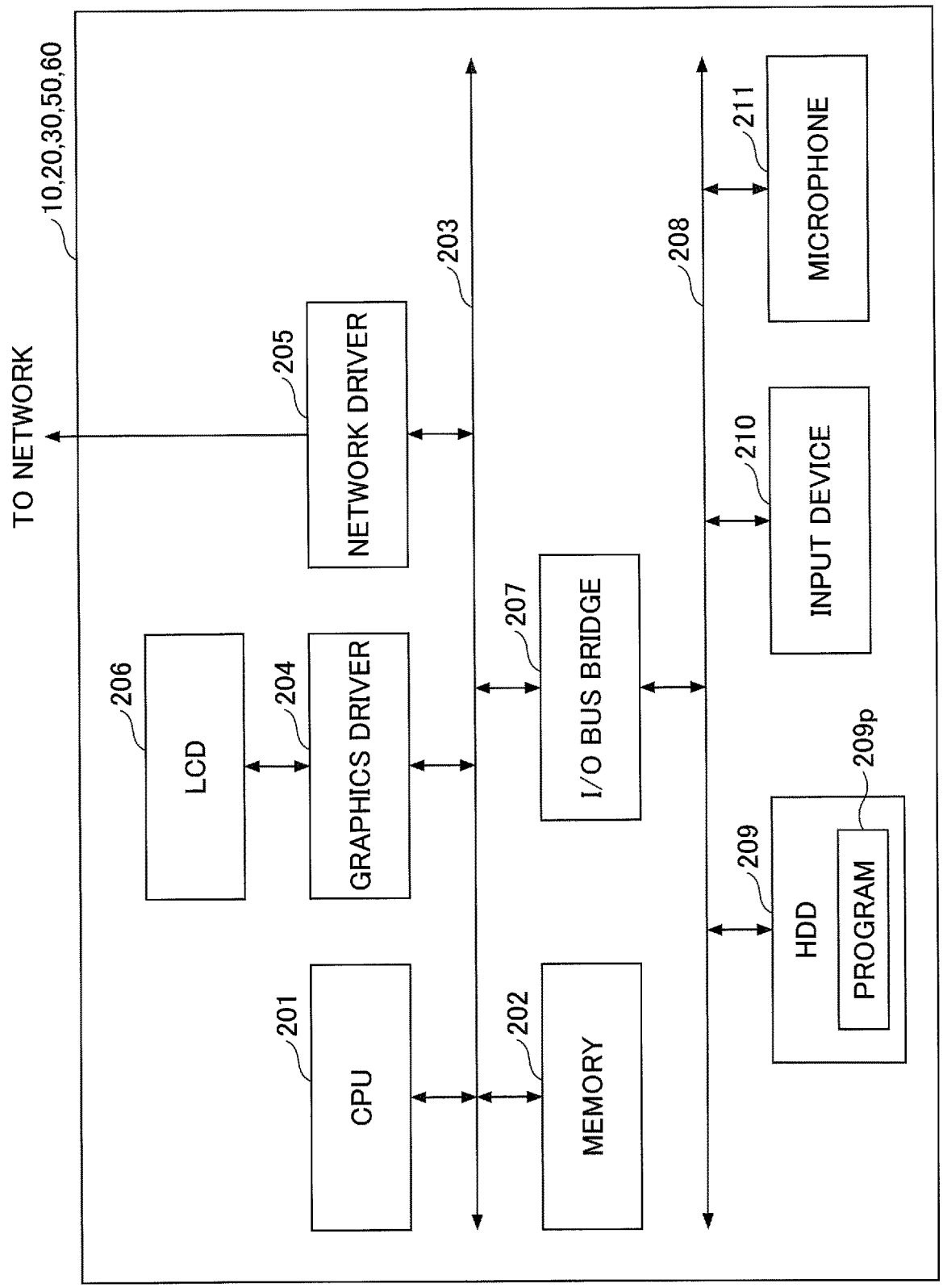
FIG. 4 is a diagram illustrating an example of a hardware configuration of a meeting management server.

FIG. 4 is a diagram illustrating an example of a hardware configuration of the meeting management server 30. The meeting management server 30 includes a central processing unit (CPU) 201 and a memory 202 that enables high-speed access to data used by the CPU 201. The CPU 201 and the memory 202 are connected to other devices or drivers, for example, a graphics driver 204 and a network driver (NIC) 205 of the meeting management server 30 via a system bus 203.

The graphics driver 204 is connected to an LCD 206 (an example of a display device or a display) via a bus, and monitors a processing result of the CPU 201. In addition, the network driver 205 connects the meeting management server 30 to the external network N2 at a transport layer level and a physical layer level to establish a session with other devices.

An input/output (I/O) bus bridge 207 is further connected to the system bus 203. On the downstream side of the I/O bus bridge 207, a storage device such as a hard disk drive (HDD) 209 is connected by an IDE, an ATA, an ATAP80I, a serial ATA, a SCSI, USB, or the like via an I/O bus 208 such as peripheral component interconnect (PCI). The HDD 209 stores a program 209p that controls the entire meeting management server 30. The HDD 209 may be a solid-state drive (SSD). The program 209p may be stored in a storage medium and distributed, or may be distributed from a program distribution server.

In addition, the I/O bus 208 is connected to an input device 210 such as a keyboard and a mouse (which is referred to as a pointing device) via a bus such as a USB, and receives an input and an instruction from an operator such as a system administrator.

The illustrated hardware configuration of the meeting management server 30 represents hardware elements preferably included in the meeting management server 30.

The hardware configurations of the reservation management server 20, the chat server 10, the registration terminal 50, the terminal apparatus 60 may be the same as the hardware configuration of the meeting management server 30. Alternatively, even if the hardware configurations of the reservation management server 20, the chat server 10, the registration terminal 50, the terminal apparatus 60 are different from the hardware configuration of the meeting management server 30, it is assumed that there is no problem in describing the resource reservation system 100 of the present embodiment. In addition, because the meeting management server 30, the reservation management server 20, and the chat server 10 correspond to cloud computing, the hardware configurations of these servers may be configured by dynamically connecting and disconnecting a hardware resource in accordance with the load. The cloud computing is a form of use in which resources on a network are used without being conscious of a specific hardware resource.

<<Hardware Configuration of Meeting Rom Terminal>>

Figure 5:
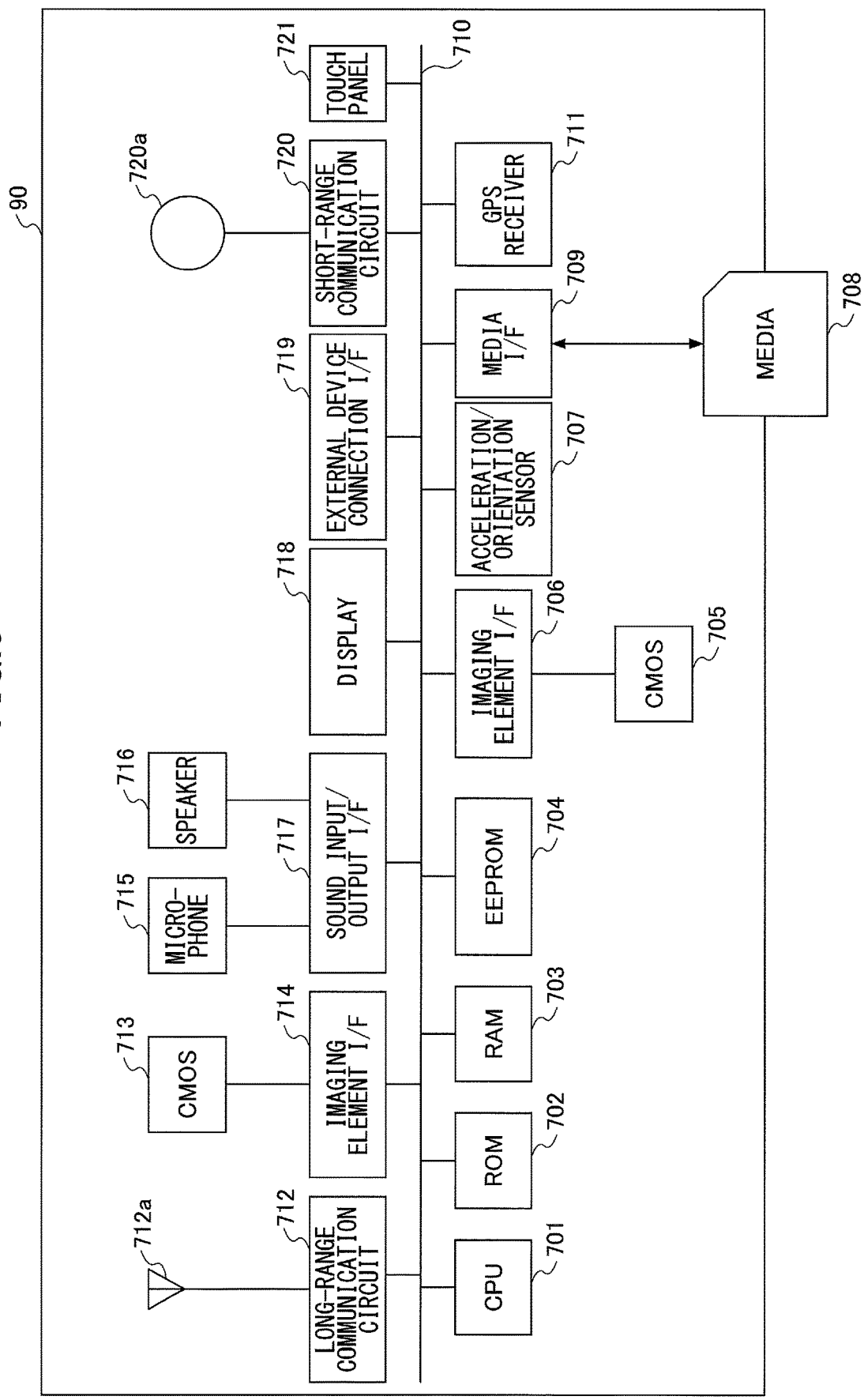
FIG. 5 is a diagram illustrating an example of a hardware configuration of the meeting room terminal.

FIG. 5 is a diagram illustrating an example of a hardware configuration of the meeting room terminal 90. The meeting room terminal 90 in FIG. 5 is assumed to be a tablet device. The meeting room terminal 90 includes a CPU 701, a read-only memory (ROM) 702, a random-access memory (RAM) 703, an electrically erasable programmable read-only memory (EEPROM) 704, a complementary metal-oxide semiconductor (CMOS) sensor 705, an imaging element interface (I/F) 706, an acceleration/orientation sensor 707, a media I/F 709, and a GPS receiver 711.

The CPU 701 controls the overall operation of the meeting room terminal 90. The ROM 702 stores programs used to drive the CPU 701 and an IPL for driving the CPU 701. The RAM 703 is used as a work area for the CPU 701. The EEPROM 704 reads and writes various data such as applications according to the control of the CPU 701. The CMOS sensor 705 is a type of a built-in imaging unit that captures a subject (mainly an image of a user his/herself) according to the control of the CPU 701 to obtain image data. Note that the CMOS sensor 705 may be any other imaging unit such as a charge-coupled device (CCD) sensor, instead of a CMOS sensor. The imaging capturing element I/F 706 is a circuit that controls the driving of the CMOS sensor 705. The acceleration/orientation sensor 707 is a sensor that detects the geomagnetic field, such as an electromagnetic compass, a gyrocompass, or an acceleration sensor. The media I/F 709 controls the reading and writing (storage) of data from and to a recording media 708 such as a flash memory. The GPS receiver 711 receives a GPS signal from a GPS satellite.

The meeting room terminal 90 includes a long-range communication circuit 712, a CMOS sensor 713, an imaging element I/F 714, a microphone 715, a speaker 716, a sound input/output I/F 717, a display 718, an external device connection I/F 719, a short-range communication circuit 720, an antenna 720a of the short-range communication circuit 720, and a touch panel 721.

The long-range communication circuit 712 is a circuit that communicates with other devices via a communication network. The CMOS sensor 713 is a type of a built-in imaging unit that captures a subject according to the control of the CPU 701 to obtain image data. The imaging element I/F 714 is a circuit that controls the driving of the CMOS sensor 713. The microphone 715 is a built-in circuit that converts sound to an electrical signal. The speaker 716 is a built-in circuit that converts an electrical signal into physical vibrations to produce sounds, such as music and voices. The sound input/output I/F 717 is a circuit that processes the input and output of a sound signal between the microphone 715 and the speaker 716 according to the control of the CPU 701. The display 718 is a type of a display unit such as a liquid crystal display or an organic electroluminescence (EL) display that displays an image or various icons of a subject. The external device connection I/F 719 is an interface for connecting various external devices. The short-range communication circuit 720 is a communication circuit such as near-field communication (NFC) or Bluetooth (registered trademark). The touch panel 721 is a type of an input unit for operating the meeting room terminal 90 by a user pressing the display 718.

The meeting room terminal 90 also includes a bus line 710. The bus line 710 is an address bus, data bus, or the like for electrically connecting components such as the CPU 701 illustrated in FIG. 5.

<Functions>

Figure 6:
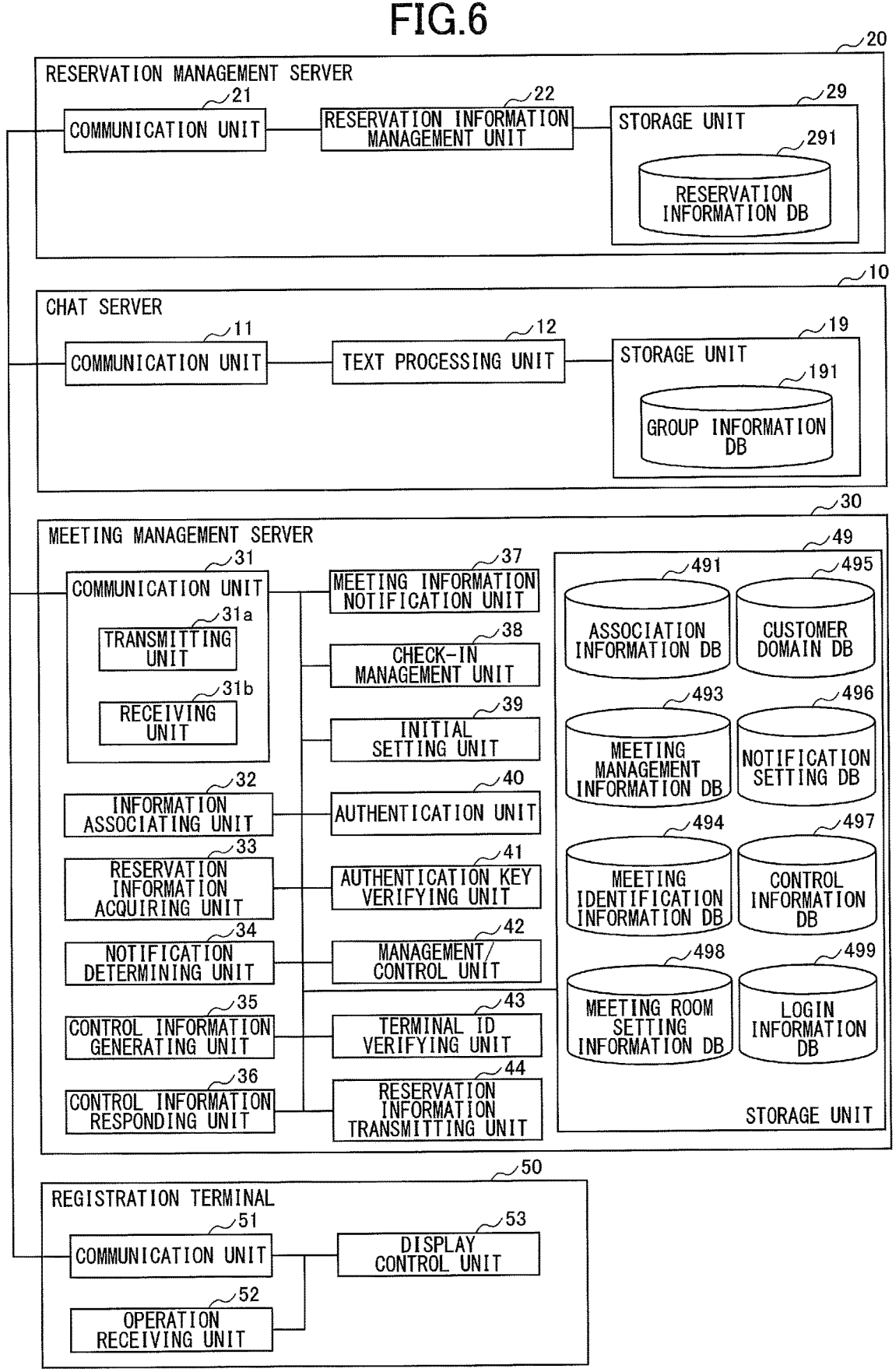
FIG. 6 is a functional block diagram illustrating functions of a reservation management server, a chat server, the meeting management server, and a registration terminal.

FIG. 6 is a functional block diagram illustrating functions of the reservation management server 20, the chat server 10, the meeting management server 30, and the registration terminal 50.

<<Reservation Management Server>>

The reservation management server 20 includes a communication unit 21 and a reservation information management unit 22. Each of the functional units included in the reservation management server 20 is a function that is implemented by causing one or more components illustrated in FIG. 4 to operate in response to a command from the CPU 201 according to the program 209p loaded from the HDD 209 to the memory 202.

The communication unit 21 transmits and receives various information to and from the meeting management server 30 and the terminal apparatus 60. The communication unit 21 transmits screen information of a reservation setting screen to the terminal apparatus 60, and receives reservation settings from the terminal apparatus 60. In addition, the communication unit 21 transmits reservation information to the meeting management server 30. The communication unit 21 is implemented by the CPU 201 of FIG. 4 executing the program 209p and controlling the network driver 205.

The reservation information management unit 22 manages reservation information registered by a user. The reservation information management unit 22 reads out reservation information of a meeting room 6, which has been requested from the meeting management server 30, from a reservation information database (DB) 291, and transmits the reservation information to the meeting management server 30 through the communication unit 21. Alternatively, when reservation information is registered (or changed), the registered (or changed) reservation information is transmitted to the meeting management server 30 without a request. A typical web application is used by the user to reserve the meeting room 6 in the reservation management server 20. The reservation information management unit 22 is implemented by the CPU 201 of FIG. 4 executing the program 209p.

The reservation management server 20 includes a storage unit 29. The storage unit 29 is implemented by the memory 202 and the HDD 209 of FIG. 4. The reservation information DB 291, a constraint condition DB 292, and a requirement condition DB 293 are stored in the storage unit 29.

TABLE 1

| | | RESERVATION INFORMATION DB | | | | |
|---|---|---|---|---|---|---|
| RESERVATION ID | ACCOUNT OF USER WHO MADE RESERVATION | MEETING NAME | MEETING ID | START TIME | END TIME | ACCOUNT OF EXPECTED PARTICIPANT |
| 001 | a@xfood.com | PRODUCT Z DEVELOPMENT MEETING | K-001 | 2017 Jul. 7 10:00 | 2017 Jul. 7 12:00 | b@xfood.com c@xfood.com d@xfood.com |
| 002 | e@xfood.com | PRODUCT Y DEVELOPMENT MEETING | K-001 | 2017 Jul. 7 13:00 | 2017 Jul. 7 14:00 | f@xfood.com g@xfood.com |
| ... | ... | ... | ... | ... | ... | ... |

Table 1 indicates an example of reservation information stored in the reservation information DB 291. The reservation information is information for managing the reservation status of the meeting room 6. The reservation information includes items such as an account of a user who made a reservation, a meeting name, a meeting room ID, a start time, an end time, and an account of a prospective participant. The reservation ID is identification information for identifying one record of reservation information. The ID is an abbreviation for identification and means an identifier or identification information. The ID is a name, a code, a character string, a numeric value, or one or more combinations thereof used to uniquely distinguish a particular object from multiple objects. The same applies to IDs other than the reservation ID. The account of the user who made the reservation is an account of an expected participant who made the reservation for the meeting room 6. The meeting name is the name of a meeting given by the expected participant. The meeting room ID is identification information for identifying the meeting room 6 in the internal network. The start time is the start of a period of time during which the meeting room 6 is reserved (a time when the meeting starts), and the end time is the end of the period of time during which the meeting room 6 is reserved (a time when the meeting ends). The account of the expected participant is the account of the participant who is scheduled to participate in the meeting. All the accounts indicated in Table 1 are issued by the reservation management server 20.

<<Chat Server>>

The chat server 10 includes a communication unit 11 and a text processing unit 12. These functional units of the chat server 10 are functions that are implemented by causing one or more hardware components illustrated in FIG. 4 to operate in response to a command form the CPU 201 in accordance with the program 209p loaded from the HDD 209 to the memory 202.

The communication unit 11 transmits and receives various information to and from the meeting management server 30.

In the present embodiment, from the meeting management server 30, the communication unit 11 receives information related to a reservation for the meeting room 6, information identifying a bot (a token as will be described later), and information identifying a notification destination group. The information identifying the bot is indicated in advance by the chat server 10 as bot identification information when the bot of the meeting management server 30 is created. Further, the communication unit 11 may receive information specifying an account of an individual such as the user who made the reservation. In addition, the communication unit 11 transmits, to the meeting management server 30, a message indicating that an expected participant has read the information related to the reservation for the meeting room 6, or a response from the expected participant regarding the displayed reservation information of the meeting room 6. The communication unit 11 is implemented by the CPU 201 of FIG. 4 executing the program 209p and controlling the network driver 205.

The text processing unit 12 transmits the information related to the reservation for the meeting room 6 to the expected participants belonging to the group, based on the information identifying the bot received from the meeting management server 30 and the information identifying the notification destination group. When an account of one expected participant belonging to the group is specified as a notification destination by the meeting management server 30, the information related to the reservation for the meeting room 6 is transmitted to the one expected participant. Therefore, the number of notifications transmitted by the text processing unit 12 may be equal to the number of the expected participants, or a notification may be transmitted only to a specific user such as the user who made the reservation.

The text processing unit 12 can perform what is known as a push notification. For example, a mechanism of the push notification may be as follows. A chat application 60a receives an ID (a token) for a push notification from a server operated by the manufacturer of the operating system (OS). In the server, the token is associated with the device (the terminal apparatus 60). The chat application 60a stores the token associated with the account of the chat application 60a in the chat server 10. When the chat server 10 performs a push notification, the chat server 10 identifies the account of the chat application 60a, thus identifying the token to which the chat application 60a is associated. The chat system sends a notification to the server operated by the manufacturer of the OS by specifying the token. The server sends a push notification to the device (terminal apparatus 60) associated with the token.

The chat server 10 includes a storage unit 19. The storage unit 19 is implemented by the memory 202 and the HDD 209 of FIG. 4. A group information DB 191 is stored in the storage unit 19.

TABLE 2

| GROUP INFORMATION DB | | | | | | |
|---|---|---|---|---|---|---|
| WORKSPACE | CHANNEL | MEMBER ACCOUNT 1 | MEMBER ACCOUNT 2 | MEMBER ACCOUNT 3 | MEMBER ACCOUNT 4 | BOT ACCOUNT |
| http://sample.com/1 | #marketing | a@chat.com | b@chat.com | c@chat.com | d@chat.com | robo@chat.com |
| http://sample.com/2 | #team1 | b@chat.com | d@chat.com | | | |
| http://sample.com/3 | #ip | f@chat.com | g@chat.com | h@chat.com | | robo@chat.com |
| . . . | . . . | . . . | . . . | . . . | . . . | . . . |

Table 2 indicates an example of group information stored in the group information DB 191. The group information is information in which the accounts of members belonging to the same group are registered. Member accounts 1 to n (n=4 in Table 2) and a bot account are registered in the group information in association with workspaces and channels.

A workspace is identification information for identifying an organization such as a company or a department. In the present embodiment, a plurality of members belong to a workspace (such as Company A). The workspace may be a URL, but may be any identification information as long as it is unique. Moreover, the workspace includes a plurality of channels according to the purpose of a chat. A channel is a group of members between which common information is exchanged, such as a group for a product A and a group for a product B, for example. One or more of members belonging to the workspace belong to the channel. In other words, a notification destination is specified by the workspace and the channel. However, a method for specifying a notification destination varies depending on the chat system. Thus, if there is identification information that can uniquely identify a group, a notification destination may be specified by the identification information alone. Alternatively, a notification destination may be specified by more than two pieces of information.

The channels are guaranteed to be unique. The member accounts 1 to n are channel member account, and are issued by the chat server 10. In the present embodiment, the bot is registered as a member for indicating information related to a reservation for the meeting room 6. The bot can be referred to as an agent of the meeting management server 30 or a fictitious member. The bot's utterance (text) is transmitted to the terminal apparatus 60 of the member accounts 1 to n.

The workspaces and the channels are managed by the meeting management server 30, and serve as information for identifying a group to which participants belong.

<<Meeting Management Server>>

The meeting management server 30 includes a communication unit 31, an information associating unit 32, a reservation information acquiring unit 33, a notification determining unit 34, a control information generating unit 35, a control information responding unit 36, a meeting information notification unit 37, a check-in management unit 38, an initial setting unit 39, an authentication unit 40, an authentication key verifying unit 41, a management/control unit 42, a terminal ID verifying unit 43, and a reservation information transmitting unit 44. Each of the above functional units of the meeting management server 30 is a function that is implemented by causing one or more components illustrated in FIG. 4 to operate in response to a command from the CPU 201 according to the program 209*p* loaded from the HDD 209 to the memory 202. The program 209*p* may be distributed from a program distribution server, or may be stored in a memory medium and distributed.

The communication unit 31 transmits and receives various information to and from the reservation management server 20, the chat server 10, the registration terminal 50, and the terminal apparatus 60. The communication unit 31 includes a transmitting unit 31*a* and a receiving unit 31*b*. The receiving unit 31*b* receives reservation information from the reservation management server 20, and receives a request for the reservation information from the meeting room terminal 90. In addition, the receiving unit 31*b* receives a check-in request from the meeting room terminal 90. Moreover, the receiving unit 31*b* receives the association between a group and accounts of a chat system from the registration terminal 50 operated by the administrator. The transmitting unit 31*a* transmits information related to a reservation for the meeting room 6 to the chat server 10, and transmits the reservation information to the meeting room terminal 90. The communication unit 31 is implemented by the CPU 201 of FIG. 4 executing the program 209*p* and controlling the network driver 205.

The information associating unit 32 mainly performs a process related to a prior registration work. That is, the information associating unit 32 receives the registration of a domain from the registration terminal 50 operated by the administrator, and registers the domain in a customer domain DB 495. A workspace and a channel of the chat system transmitted from the registration terminal 50 are associated with accounts of the reservation management server 20 and registered in an association information DB 491. The information associating unit 32 is implemented by the CPU 201 of FIG. 4 executing the program 209*p*.

The reservation information acquiring unit 33 specifies the account of a customer who uses the resource reservation system 100 or the account of the meeting room 6, acquires reservation information from the reservation management server 20, and registers the reservation information as meeting management information in a meeting management information DB 493. Alternatively, the reservation information acquiring unit 33 receives changes in the reservation information. Accordingly, at least some of reservation information held by the reservation management server 20 is stored in the meeting management information DB 493. The reservation information acquiring unit 33 acquires the reservation information for a predetermined period of time from the current time, from among the reservation information held by the reservation management server 20. The predetermined period of time is determined by how far ahead reservations for the meeting room 6 is to be included in the reservation information. The reservation information acquiring unit 33 is implemented by the CPU 201 of FIG. 4 executing the program 209*p*.

The notification determining unit 34 determines whether a reservation whose start time fulfills a notification condition is included in the meeting management information DB 493. For example, referring to a notification setting DB 496, the notification determining unit 34 determines to send a notification when a set date and time, which is calculated backward from the start time, is reached. For example, if bots are divided by role, such as a bot for reminder and a bot for receiving a reservation, a bot may be specified in accordance with the process. The notification determining unit 34 is implemented by the CPU 201 of FIG. 4 executing the program 209*p*.

When the notification determining unit 34 determines that a notification is to be sent, the meeting information notification unit 37 specifies information for identifying a bot (for example, a token in Slack) and information for specifying a notification destination group, and requests the chat server 10 to notify information related to a reservation for the meeting room 6. The notification is sent several times, and at least one notification includes meeting identification information. The meeting identification information is information for the meeting management server 30 to confirm that the participant has the right to use the reserved meeting room 6 during the reserved time. The meeting information notification unit 37 generates the meeting identification information at least before a final notification. The meeting identification information is registered in a meeting identification information DB 494. The meeting information notification unit 37 is implemented by the CPU 201 of FIG. 4 executing the program 209*p*.

The control information generating unit 35 refers to the meeting management information to generate control information for the electronic device 70, and registers the control information in a control information DB 497. For example, at a few minutes before the meeting start time, the control information generating unit 35 generates control information to turn on the power of the electronic device 70, and when detecting check-out, generates control information to turn off the power of the electronic device 70. The control information is stored in the control information DB 497. The control information generating unit 35 is implemented by the CPU 201 of FIG. 4 executing the program 209*p*.

The control information responding unit 36 receives an inquiry about control information from the meeting room terminal 90 of the meeting room 6, refers to the control information DB 497, and transmits the control information corresponding to the meeting room 6 to the meeting room terminal 90. The control information responding unit 36 is implemented by the CPU 201 of FIG. 4 executing the program 209*p*.

The check-in management unit 38 manages check-ins/check-outs to the meeting rooms 6. In addition, the check-in management unit 38 registers a meeting status associated with a check-in/check-out in the meeting management information DB 493. A check-in is allowed 5 to 10 minutes before the start time of a meeting specified by the reservation ID. Moreover, a check-in is allowed when a set of a meeting room ID and meeting identification information transmitted from the meeting room terminal 90 is registered in the meeting identification information DB 494. The check-in management unit 38 is implemented by the CPU 201 of FIG. 4 executing the program 209*p*.

The initial setting unit 39 mainly performs a process for configuring the initial settings for the meeting room terminal 90. The initial setting unit 39 also performs a process for changing the communication settings of the meeting room terminal 90 after the initial settings. For example, the initial setting unit 39 provides a list of the meeting rooms 6 to the registration terminal 50 of the administrator of the resource reservation system 100. When the administrator of the resource reservation system 100 selects a meeting room 6, the initial setting unit 39 identifies the meeting room 6 ID and the meeting room name of the meeting room 6 selected by the administrator, generates an authentication key, and transmits the URL (uniform resource locator, address information of the meeting management server 30) of the meeting management server 30 to the registration terminal 50. The initial setting unit 39 is implemented by the CPU 201 of FIG. 4 executing the program 209p. The functions of the initial setting unit 39 will be described in detail with reference to FIG. 8.

The authentication unit 40 authenticates the administrator based on a login password and a user ID.

The authentication key verifying unit 41 authenticates the meeting room terminal 90 based on whether an authentication key transmitted from the meeting room terminal 90 matches an authentication key registered in a meeting room setting information DB 498. Accordingly, only the meeting room terminal 90 having a valid authentication key can acquire reservation information.

The management/control unit 42 determines whether to transmit reservation information. That is, the operation state (registered in the meeting room setting information DB 498) of the meeting room associated with the meeting room terminal 90 is "operating", and the connection state of the meeting room terminal 90 is not set to "connection refused", the management/control unit 42 determines that reservation information can be transmitted.

The terminal ID verifying unit 43 verifies whether the number of meeting room terminals 90 registered in one meeting room exceeds a predetermined number based on terminal IDs.

In response to a request from the meeting room terminal 90, the reservation information transmitting unit 44 transmits the reservation information (meeting management information) stored in the meeting management information DB 493 to the meeting room terminal 90. However, the reservation information is transmitted only when the authentication using the authentication key is successful, the operation state is set to "operating", and the connection state is not set to "connection refused". The reservation information transmitting unit 44 may transmit the reservation information in a JSON format, an XML format, or a comma-separated values (CVS) format. The reservation information is transmitted repeatedly, and thus a format with less capacity is advantageous.

In addition, the meeting management server 30 includes a storage unit 49. The storage unit 49 is implemented by the memory 202 and the HDD 209 of FIG. 4. The storage unit 49 stores the association information DB 491, the meeting management information DB 493, the meeting identification information DB 494, the customer domain DB 495, the notification setting DB 496, the control information DB 497, the meeting room setting information DB 498, and the login information DB 499.

TABLE 3

ASSOCIATION INFORMATION DB

| WORKSPACE | CHANNEL | MEMBER ACCOUNT 1 | MEMBER ACCOUNT 2 | MEMBER ACCOUNT 3 | MEMBER ACCOUNT 4 |
| --- | --- | --- | --- | --- | --- |
| http://sample.com/1 | #marketing | a@xfood.com a@chat.com | b@xfood.com b@chat.com | c@xfood.com c@chat.com | d@xfood.com d@chat.com |
| http://sample.com/2 | #team1 | f@xfood.com f@chat.com | g@xfood.com g@chat.com | h@xfood.com h@chat.com | |
| ... | ... | ... | ... | ... | ... |

Table 3 indicates an example of association information stored in the associating information DB 491. The association information is information that associates accounts of the reservation management system with a group of a chat system. The association information includes items such as a workspace, a channel, and member accounts 1 to n (n=4 in the table). The workspace and channel are as described above. The accounts of participants issued by the reservation management server 20 are registered as the member accounts 1 to n. In addition, as illustrated in Table 3, accounts of the chat system may be registered. In order to notify the group, an account of the reservation management server 20 of a user who reserved a meeting, a group to be notified, and information for specifying a channel (in the present embodiment, a workspace name and a channel name) are required. There is no need to register accounts of all members belonging to a group. However, when notifying an individual user, account information of each chat system is required. Thus, account information may be registered as illustrated in Table 3.

TABLE 4

MEETING MANAGEMENT INFORMATION DB

| RESERVATION ID | ACCOUNT OF USER WHO MADE RESERVATION | MEETING NAME | MEETING ROOM ID | START TIME | END TIME | ACCOUNT OF EXPECTED PARTICIPANT | STATUS |
| --- | --- | --- | --- | --- | --- | --- | --- |
| 001 | a@xfood.com | PRODUCT Z DEVELOPMENT MEETING | K-001 | 2017 Jul. 7 10:00 | 2017 Jul. 7 12:00 | b@xfood.com c@xfood.com d@xfood.com | CHECKED IN |

TABLE 4-continued

MEETING MANAGEMENT INFORMATION DB

| RESERVATION ID | ACCOUNT OF USER WHO MADE RESERVATION | MEETING NAME | MEETING ROOM ID | START TIME | END TIME | ACCOUNT OF EXPECTED PARTICIPANT | STATUS |
|---|---|---|---|---|---|---|---|
| 002 | e@xfood.com | PRODUCT Y DEVELOPMENT MEETING | K-001 | 2017 Jul. 7 13:00 | 2017 Jul. 7 14:00 | f@xfood.com g@xfood.com | NOTIFIED |
| ... | ... | ... | ... | ... | ... | ... | ... |

Table 4 indicates an example of meeting management information stored in the meeting management information DB 493 of the meeting management server 30. Because part of the meeting management information stored in the meeting management information DB 493 is reservation information, differences from the reservation information DB 291 in Table 1 will be described with reference to Table 4. The meeting management information in Table 4 includes an item "status". The "status" indicates the status of a reservation. For example, the "status" indicates that information related to a reservation for a meeting room 6 has been notified, the reservation has been confirmed, the meeting room 6 has been checked in, the meeting room 6 has been checked out, or the meeting room 6 has been canceled.

TABLE 5

MEETING IDENTIFICATION INFORMATION DB

| RESERVATION ID | MEETING ROOM ID | MEETING IDENTIFICATION INFORMATION |
|---|---|---|
| 001 | K-001 | 1234 |
| 002 | K-002 | 5678 |
| ... | ... | ... |

Table 5 indicates an example of meeting identification information management information stored in the meeting identification information DB 494. The meeting identification information management information is information for managing meeting identification information for each reservation. The meeting identification information management information includes items such as a reservation ID, a meeting room ID, and meeting identification information. These items are the same as the reservation information (the reservation information received from the reservation management server 20) except for the meeting identification information, and have already described above. Thus, a description thereof will be omitted. The reservation ID is registered to identify a reservation for the same meeting room 6.

TABLE 6

CUSTOMER DOMAIN DB

| CUSTOMER DOMAIN NAME | CUSTOMER ADMINISTRATOR ACCOUNT |
|---|---|
| xfood.com | a@xfood.com |
| ycar.com | f@ycar.com |
| ... | ... |

Table 6 indicates an example of customer domain information stored in the customer domain DB 495. The customer domain information is information for managing a customer domain and a customer administrator account. The customer domain and the customer administrator account are associated with each other, and registered in the customer domain information. The customer domain in Table 6 is the domain of an account (email address) issued by the reservation management server 20. In addition, the administrator account is an account of a customer administrator (representative). The accounts in Table 6 are issued by the reservation management server 20.

TABLE 7

NOTIFICATION SETTING DB

| CUSTOMER DOMAIN NAME | NOTIFICATION SETTING |
|---|---|
| xfood.com | ONE DAY BEFORE |
| ycar.com | 12 HOURS BEFORE |
| ... | ... |

Table 7 indicates an example of notification setting information stored in the notification setting DB 496. The notification setting information retains a notification setting for each customer. The customer domain and the notification setting are associated with each other, and registered in the notification setting information. The notification setting indicates how long before the start time information related to a reservation for a meeting room 6 is to be notified. Alternatively, a fixed date and time may be set. In addition, the notification setting is not limited to one, and a plurality of notification settings may be registered for one customer.

TABLE 8

CONTROL INFORMATION DB

| MEETING ROOM ID | CONTROL INFORMATION |
|---|---|
| K-001 | POWER ON |
| K-002 | POWER OFF |
| ... | ... |

Table 8 indicates an example of control information stored in the control information DB 497. The control information is information for controlling an electronic device 70 in a meeting room 6. The control information includes items such as a meeting room ID and control information. The control information indicates a method for controlling the electronic device 70. The meeting management server 30 can set detailed control information for each electronic device 70. The reason why a control timing is not registered is because it is difficult to transmit control information from the meeting management server 30 in the external network to the meeting room terminal 90. Therefore, when the meeting room terminal 90 accesses the meeting management server 30, control information is transmitted, if generated.

TABLE 9

MEETING ROOM SETTING INFORMATION DB

| CUSTOMER ID | MEETING ROOM NAME | MEETING ROOM ID | TERMINAL ID | CONNECTION STATE | AUTHENTI-CATION KEY | OPERATION STATE | LAST ACCESSED TIME | NUMBER OF MEETING ROOM TERMINALS THAT CAN BE REGISTERED |
|---|---|---|---|---|---|---|---|---|
| G-001 | MEETING ROOM A | K-001 | AAAAA | CONNECTED | ***** | OPERATING | 2019 May 15 18:55:30 | 1 |
|  | MEETING ROOM B | K-002 | BBBBB | AFTER SETUP | ***** | STOPPED | 2019 May 15 16:10:12 | 1 |
|  | MEETING ROOM C | K-003 | CCCCC | DISCONNECTED | ***** | OPERATING | 2019 May 15 14:30:45 | 2 |

Table 9 indicates an example of meeting room setting information stored in the meeting room setting information DB 498. The meeting room setting information is setting information for each meeting room. The meeting room setting information includes items such as a meeting room name, a meeting room ID, a terminal ID, a connection state, an authentication key, an operation state, a last accessed time, and the number of meeting room terminals 90 that can be registered, in association with a customer ID.

The meeting room name indicates a general name of a meeting room recognized by meeting participants, for example, a name presented at the entrance of the meeting room.

The meeting room ID indicates identification information for uniquely identifying the meeting room as described above. For simplicity, the meeting room ID can be shared with the reservation management server 20. Alternatively, by providing a conversion table, the administrator can set a meeting room ID separately from the reservation management server 20.

The terminal ID indicates identification information for uniquely identifying a meeting room terminal 90. For example, identification information of a terminal application 90*a* may be used.

The connection state indicates whether the initial settings for the meeting room terminal 90 has been completed and communication is possible. A "connected" state indicates that communication is confirmed within a certain period of time. An "after setup" state indicates that the initial settings are completed, but the initial communication has not been performed. A "disconnected" state indicates that no communication is performed for a certain period of time. A "connection refused" state indicates that a request for reservation information from the meeting room terminal 90 is refused.

The authentication key indicates authentication information for the meeting management server 30 to authenticate a meeting room terminal 90. The authentication key is transmitted to the meeting room terminal 90 at the initial settings. The authentication key is a combination of numbers, alphabets, and symbols, which is long enough to be unspecified by a brute force method. The authentication key may be determined by the meeting management server 30 or by the administrator.

The operation state indicates whether the meeting management server 30 starts a meeting room management service of the meeting room associated with the meeting room terminal 90 after the initial settings for the meeting room terminal 90 are completed ("operating" indicates that the management service will start, and "stopped" indicates that the management service will not start). By setting the "operation state", it is possible to minimize inconvenience caused by a time lag between the completion of the initial settings and the installation of the meeting room terminal 90. Note that the operation state, indicating whether the meeting room management service is turned on or off, is set on a per-meeting-room basis, and the connection state is set on a per-meeting-room-terminal basis.

The "last accessed time" indicates the time when the meeting room terminal 90 last requested the meeting management server 30 to transmit reservation information.

The "number of meeting room terminals 90 that can be registered" is the number of meeting room terminals that can be associated with one meeting room. There is no problem if one meeting room terminal 90 is installed in one meeting room. However, if an error occurs in the one meeting room terminal 90, it is difficult to check in the meeting room until the meeting room terminal 90 is repaired. For this reason, the administrator may associate multiple meeting room terminals with one meeting room. Accordingly, even if an authentication key of a meeting room terminal 90 is revealed, it is possible to prevent reservation information from being revealed because a terminal ID of the meeting room terminal 90 is required to match a registered ID, and also the number of terminal IDs associate with one meeting room is predetermined. The default value may be one or plural.

The meeting room name and the meeting room ID are predetermined, or may be set by the administrator. Alternatively, the meeting room name and the meeting room ID transmitted from the reservation management server 20 may be used. The terminal ID may be generated by the terminal application and indicated to the meeting management server 30 (in this case, the terminal ID is blank at the initial state). Alternatively, the meeting management server 30 may assign and set a terminal ID. The initial state of the connection state (immediately after the initial settings are configured by the administrator) is "after setup". The connection state changes in accordance with the status of communication. The authentication key is assigned and set by the meeting management server 30 at the initial settings. The initial state of the operation state is "stopped". The "number of meeting room terminals 90 that can be registered" can be set by the administrator. The number of meeting room terminals 90 that can be registered is often 1 or more. When the number is set to 1, one meeting room terminal 90 can be registered in one meeting room.

TABLE 10

LOGIN INFORMATION DB

| CUSTOMER ID | LOGIN PASSWORD | USER ID | SERVER URL |
|---|---|---|---|
| G-001 | ********* | a@xfood.com | http://kaigi.xfood.com/ |

Table 10 indicates an example of login information stored in the login information DB 499. The login information is information allowing the administrator to log in to the meeting management server 30. The login information includes items such as a customer ID, a login password, a user ID, and a server URL. The administrator logs in to the meeting management server 30 with the login password and the user ID, and displays a meeting room management screen, which will be described later, on the registration terminal 50. When the administrator logs in, a customer for which the administrator installs a meeting room terminal 90 in a meeting room is identified. In addition, the server URL assigned to the customer is registered in the login information DB 499, thereby allowing the meeting room terminal 90 of the customer to communicate with the meeting management server 30. The server URL is a URL, of the meeting management server 30, assigned to the customer. The meeting room terminal 90 can acquire reservation information by accessing the server URL. Note that a common server URL may be used by a plurality of customers.

<<Registration Terminal>>

The registration terminal 50 includes a communication unit 51, an operation receiving unit 52, and a display control unit 53. The functional units of the registration terminal 50 are functions that are implemented by causing one or more hardware components illustrated in FIG. 4 to operate in response to a command from the CPU 201 in accordance with the program 209p loaded from the HDD 209 to the memory 202. The program 209p may be distributed from a program distribution server, or may be stored in a storage medium and distributed.

The registration terminal 50 is a terminal on which the administrator configures various settings related to a meeting room via a web page provided by the meeting management server 30. The various settings include the initial settings. The terminal apparatus 60 may be used for the initial settings. The functions of the communication unit 51, the operation receiving unit 52, and the display control unit 53 of the registration terminal 50 are the same as the functions of the terminal apparatus 60, and the details will be described together with the terminal apparatus 60.

<<Terminal Apparatus>>

Figure 7:
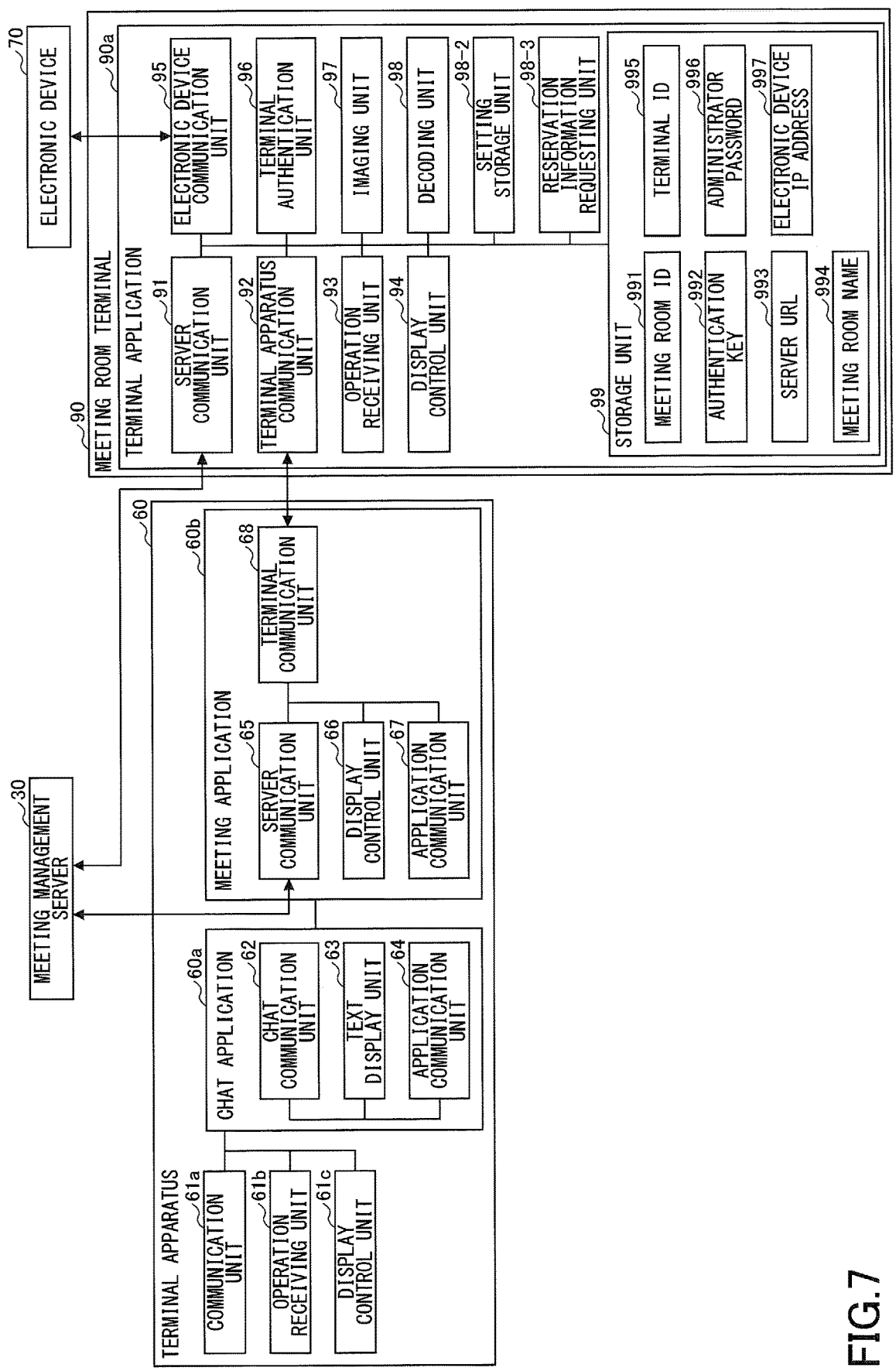
FIG. 7 is a functional block diagram illustrating functions of a terminal apparatus and the meeting room terminal.

FIG. 7 is a functional block diagram illustrating functions of the terminal apparatus 60 and the meeting room terminal 90. The functions of the electronic device 70 will be described as necessary.

The terminal apparatus 60 includes a communication unit 61a, an operation receiving unit 61b, a display control unit 61c, a chat communication unit 62, a text display unit 63, an application communication unit 64, a server communication unit 65, a display control unit 66, an application communication unit 67, and a terminal communication unit 68. The functional units of the terminal apparatus 60 are functions that are implemented by causing one or more hardware components illustrated in FIG. 4 to operate in response to a command from the CPU 201 in accordance with the program 209p loaded from the HDD 209 to the memory 202. The program 209p may be distributed from a program distribution server, or may be stored in a storage medium and distributed. Because the chat application 60a and a meeting application 60b are operated in the terminal apparatus 60, the program 209p includes the chat application 60a and the meeting application 60b.

The communication unit 61a transmits and receives various information to and from the meeting management server 30 and the reservation management server 20. The communication unit 61a is implemented by the CPU 201 of FIG. 4 executing the program 209p and controlling the network driver 205.

The operation receiving unit 61b receives various operations performed by a participant with respect to the terminal apparatus 60. The operation receiving unit 61b is implemented by the CPU 201 of FIG. 4 executing the program 209p and controlling the input device 210.

The display control unit 61c interprets screen information of various screens, and displays the screen information on the LCD 206. For example, the operation receiving unit 61b and the display control unit 61c may include browser functions, and execute web applications. For example, the display control unit 61c displays the reservation setting screen received from the reservation management server 20, and the operation receiving unit 61b receives reservation information set by the user who made a reservation.

The chat communication unit 62 of the chat application 60a transmits and receives various information to and from the chat server 10. In the present embodiment, the chat communication unit 62 receives information related to a reservation for a meeting room 6 from the chat server 10, and indicates the information has been read to the chat server 10. In addition, the chat communication unit 62 indicates whether the meeting room 6 is used or cancelled to the chat server 10. The chat communication unit 62 is implemented by the CPU 201 of FIG. 4 executing the program 209p and controlling the network driver 205.

The text display unit 63 of the chat application 60a displays a text (the information related to the reservation for the meeting room 6) transmitted from the chat server 10. For example, the source of an utterance is bot, and the text display unit 63 displays the text as if the bot inputs the text. The text display unit 63 is implemented by the CPU 201 of FIG. 4 executing the chat application 60a.

The application communication unit 64 of the chat application 60a calls the meeting application 60b, and transmits meeting identification information to the meeting application 60b. The chat server 10 transmits information for identifying the meeting application 60b to the terminal apparatus 60, when indicating the information related to the reservation for the meeting room 6. Accordingly, the chat application 60a specifies the meeting application 60b to the OS, and requests a notification of the meeting identification information. The OS can start the meeting application 60b. The application communication unit 64 is implemented by the CPU 201 of FIG. 4 executing the chat application 60a.

The server communication unit 65 of the meeting application 60b communicates with the meeting management server 30. A two-dimensional code including the meeting identification information is acquired from the meeting management server 30. The server communication unit 65 is implemented by the CPU 201 of FIG. 4 executing the meeting application 60b. The two-dimensional code is used for authentication at check-in, and may be a few digits for authentication.

The display control unit 66 of the meeting application 60b displays, on the LCD 206, the two-dimensional code including the meeting identification information. The display control unit 66 is implemented by the CPU 201 of FIG. 4 executing the meeting application 60b and controlling the graphics driver.

The application communication unit 67 of the meeting application 60b acquires various information (such as the meeting identification information included in the information related to the reservation for the meeting room 6) from the chat application 60a through the OS. The application communication unit 67 is implemented by the CPU 201 of FIG. 4 executing the meeting application 60b.

The terminal communication unit 68 communicates with the meeting room terminal 90, and transmits the meeting identification information. The terminal communication unit 68 detects the presence of the meeting room terminal 90 by short-range wireless communication such as Bluetooth (registered trademark), and transmits the meeting identification information in response to detecting the meeting room terminal 90. In addition, the terminal communication unit 68 provides the meeting room terminal 90 with a function to display the two-dimensional code. The terminal communication unit 68 is implemented by the CPU 201 of FIG. 4 executing the meeting application 60b.

<<Meeting Room Terminal>>

The meeting room terminal 90 includes a server communication unit 91, a terminal apparatus communication unit 92, an operation receiving unit 93, a display control unit 94, an electronic device communication unit 95, a terminal authentication unit 96, an imaging unit 97, a decoding unit 98, a setting storage unit 98-2, and a reservation information requesting unit 98-3. The functional units of the meeting room terminal 90 are functions that are implemented by causing one or more hardware components illustrated in FIG. 5 to operate in response to a command from the CPU 701 in accordance with the program loaded from the EEPROM 704 to the RAM 703. The program 604p may be distributed from a program distribution server, or may be stored in a storage medium and distributed.

The server communication unit 91 communicates with the meeting management server 30, with a server URL 993 as a destination. Because the meeting room terminal 90 is located in the internal network, it is difficult for the meeting management server 30 to communicate with the meeting room terminal 90. Therefore, the server communication unit 91 communicates with the meeting management server 30 by using a communication technology such as polling (communicating with the meeting management server 30 periodically) or WebSocket. When there is no communication from the server communication unit 91, the connection state "disconnected" is registered in the meeting room setting information DB 498. The server communication unit 91 may communicate using a communication protocol such as HTTP, and the communication protocol is not particularly limited.

The server communication unit 91 of the preset embodiment receives reservation information, and transmits meeting identification information, received by the terminal apparatus communication unit 92 from the terminal apparatus 60 or manually input at the time of check-in, to the meeting management server 30. In addition, the server communication unit 91 receives control information from the meeting management server 30. The server communication unit 91 is implemented by the CPU 701 of FIG. 5 executing the program and controlling the long-range communication circuit 712.

The terminal apparatus communication unit 92 communicates with the terminal apparatus 60. In the present embodiment, the terminal apparatus communication unit 92 receives the meeting identification information. The terminal apparatus communication unit 92 is implemented by the CPU 701 of FIG. 5 executing the program and controlling the short-range communication circuit 720.

The electronic device communication unit 95 communicates with the electronic device 70. In the present embodiment, the electronic device communication unit 95 transmits the control information, received by the server communication unit 91, to the electronic device 70. The electronic device communication unit 95 is implemented by the CPU 701 of FIG. 5 executing the program and controlling the long-range communication circuit 712.

The display control unit 94 displays a screen generated by the terminal application 90a on the display 718. The screen is a standby screen that allows a check-in and a check-out. The display control unit 94 is implemented by the CPU 701 of FIG. 5 executing the program and controlling the display 718.

The operation receiving unit 93 receives various operations on the meeting room terminal 90. For example, the operation receiving unit 93 is implemented by the CPU 701 of FIG. 5 executing the program and controlling the touch panel 721.

The terminal authentication unit 96 authenticates an administrator login to the terminal application, based on whether an entered administrator password is correct. The meeting room terminal 90 installed in the meeting room can be operated by any participant. Therefore, without the authentication function, the initial settings may be changed.

The imaging unit 97 mainly captures an image code. When the administrator operates the meeting room terminal 90 such that an image code is within the angle of view of the CMOS sensor 713, the imaging unit 97 identifies the image code, and automatically generates image data. The decoding unit 98 decodes the image code captured by the imaging unit 97 to restore communication setting information.

The setting storage unit 98-2 stores, in a storage unit 99, the communication setting information (a meeting room ID, an authentication key, a server URL, and a meeting room name) decoded by the decoding unit 98.

In short, the communication setting information is information necessary for the meeting room terminal 90 to communicate with the meeting management server 30. The server URL is information for identifying a communication destination. The authentication key is information for authentication. The meeting room name is information displayed by the meeting room terminal 90, and is not necessarily required to be included in the communication setting information.

The reservation information requesting unit 98-3 repeatedly transmits the meeting room ID and the authentication key to the meeting management server 30 via the server communication unit 91 to acquire reservation information at periodic intervals. As a response, the reservation information requesting unit 98-3 acquires the reservation information via the server communication unit 91. The reservation information requesting unit 98-3 may acquire the reservation information only when the reservation information is changed. For example, the reservation information requesting unit 98-3 may transmit the meeting room ID and the authentication key at intervals of few seconds to few minutes. The shorter the interval is, the sooner the reservation information is updated. However, the communication load increases. Accordingly, the periodic interval is determined by taking into account of both the update frequency of the reservation information and the communication load. In the present embodiment, the reservation information requesting unit 98-3 may acquire the reservation information at intervals of 30 seconds. In addition, the reservation information requesting unit 98-3 can receive at least meeting management information (reservation information) of the meeting room 6 on that day via the server communication unit 91.

In addition, the meeting room terminal 90 includes the storage unit 99. The storage unit 99 is implemented by the ROM 702 and the EEPROM 704 of FIG. 5. A meeting room ID 991, an authentication key 992, a server URL 993, a meeting room name 994, a terminal ID 995, an administrator password 996, and an IP address 997 of the electronic device 70 are stored in the storage unit 99.

The terminal ID 995 is identification information of the meeting room terminal 90. Terminal IDs allows a plurality of meeting room terminals to be associated with one meeting room. In addition, the terminal IDs are used by the meeting management server 30 to prevent more than a predetermined number of meeting room terminals, associated with one meeting room, from connecting to the meeting management server 30. Each of the terminal IDs is required to be unique, such as a universally unique identifier (UUID) of a terminal application 90a and a MAC address. The UUID is a unique identifier in which two or more items do not have the same value in the world without specific management.

The administrator password 996 is set by the administrator when the terminal application 90a is installed or at an initial startup. The IP address 997 of the electronic device 70 is set by the administrator as necessary.

<Initial Setting Unit of Meeting Management Server>

FIG. 8 is a functional block diagram illustrating functions of the initial setting unit 39. The initial setting unit 39 includes a setting screen generating unit 391, an authentication key generating unit 392, an encryption unit 393, an image code generating unit 394, an information management unit 395, and a setting receiving unit 396. The storage unit 49 is the same as that of FIG. 6. The initial setting unit 39 control the functions such that necessary processes are performed.

The information management unit 395 reads various information stored in the storage unit 49, and sends the information to any of the functions (the setting screen generating unit 391, the authentication key generating unit 392, the encryption unit 393, the image code generating unit 394, the setting receiving unit 396) requiring the information.

The setting screen generating unit 391 generates screen information of a conference room management screen or an installed terminals list screen, which will be described later, and transmits the screen information to the registration terminal 50 through the communication unit 31. The screen information is created by HTML, XML, cascade style sheet (CSS), or JavaScript (registered trademark), and displayed as a web page. The meeting room management screen and the installed terminals list screen are provided as screens of a web application that runs on a browser by JavaScript (registered trademark).

The setting receiving unit 396 receives settings configured by the administrator on the meeting room management screen and the installed terminals list screen. That is, the setting receiving unit 396 receives changes in the operation state and in the connection state received by the receiving unit 31b, and sets the changes in the meeting room setting information DB 498 through the information management unit 395. Changes in the connection state correspond to changes in communication settings.

The encryption unit 393 encrypts communication setting information acquired by the information management unit 395 from the storage unit 49. The image code generating unit 394 encodes the encrypted communication setting information into an image code.

<Example Screens>

FIG. 9A is an example of a meeting room management screen 501 displayed by the registration terminal 50. The administrator has logged in to the meeting management server 30 from the registration terminal 50 with the login password and the user ID. The meeting room management screen 501 (an example of a second web page) is a screen on which the administrator can change the settings for meeting rooms. For example, the meeting room management screen 501 allows the administrator to check or edit the operation state, or configure the initial settings for a meeting room terminal 90.

The meeting room management screen 501 includes a Manage Meeting Rooms button 508 and a List of Installed Terminals button 509. The meeting room management screen 501 is displayed by pressing the Manage Meeting Rooms button 508. The meeting room management screen 501 displays columns such as a checkbox field 502, a meeting room name field 503, a meeting room ID field 504, an operation state field 505, an image code field 506, and an edit field 507.

Figure 11:
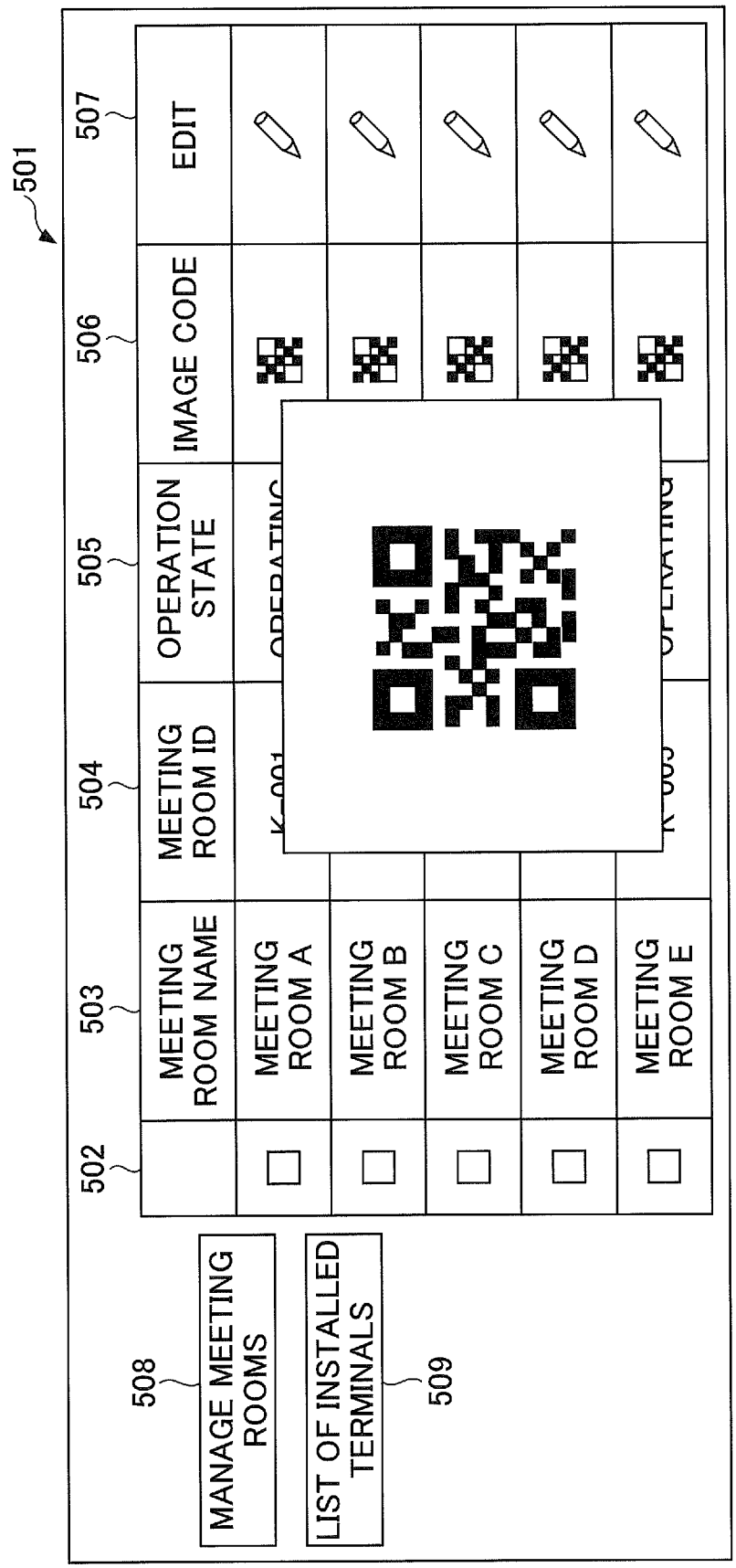
FIG. 11 is a diagram illustrating the meeting room management screen on which an image code is superimposed and displayed.

The checkbox field 50 is a field where the administrator selects a checkbox of the selected meeting room. The meeting room name field 503 displays a meeting room name, and the meeting room ID field 504 displays a meeting room ID. The operation state field 505 displays the operation state of the meeting room management service. The operation state will be described with reference to FIG. 9B. The image code field 506 displays an icon for displaying an image code. When the administrator selects an icon, an image code in which communication setting information is encoded is displayed. FIG. 11 displays an example in which the image code is selected.

The edit field 507 displays an icon for the administrator to edit the operation state. When an icon in the edit field 507 is pressed, a pull-down menu is displayed to allow the administrator to select the operation state, as illustrated in FIG. 9B. In order to display the pull-down menu illustrated in FIG. 9B, the meeting room management screen 501 may transition to the pull-down menu illustrated in FIG. 9B, or the pull-down menu illustrated in FIG. 9B may be displayed on the meeting room management screen 501.

FIG. 9B illustrates example operation states. The operation states include "operating", "stopped", and "test operation".

In the "operating" state, the meeting room management service is started. In the "stopped" state, the meeting room management service is stopped. In the "test operation" state, only some functions of the meeting room management service are enabled. The meeting room management service includes displaying reservation information (a check-in, a check-out, extension, and "use now"), controlling an electronic device associated with a check-in and a check-out, and automatically cancelling a reservation.

By selecting "operating" or "stopped", it is possible to minimize inconvenience caused by automatic cancellation. For example, if the work location 102 of the administrator is located away from a meeting room, it takes time for the administrator to install a meeting room terminal 90 in the meeting room after configuring the initial setting for the meeting room terminal 90. If a predetermined period of time elapses while the meeting room terminal 90 is being installed after the initial settings, the reservation of the meeting room may be cancelled even if there are participants. In addition, the meeting room may be double-booked, and other people may enter the meeting room. When the operation state is set to "stopped" by the administrator, automatic cancellation can be avoided.

In the "test operation" state, only some functions of the meeting room management service are enabled. For example, the reservation information may be transmitted to the meeting room terminal 90, but the automatic cancellation function may be turned off. Accordingly, the meeting room terminal 90 can be set for test purposes.

FIG. 10A illustrates an example of an installed terminals list screen 620 displayed by the registration terminal. The installed terminals list screen 620 (an example of a first web page) is displayed by pressing the List of Installed Terminals button 509. The installed terminals list screen 620 displays information related to meeting room terminals 90 of meeting rooms. In addition, the installed terminals list screen 620 allows the administrator to edit the connection state.

The installed terminals list screen 620 displays columns such as a checkbox field 621, a meeting room name field 622, a terminal ID field 623, a connection state field 624, last accessed time field 625, and an edit field 626. The checkbox field 621 and the meeting room name field 622 are same as the checkbox field 502 and the meeting room name field 503 of the meeting room management screen 501. The terminal ID field 623 displays a terminal ID. The connection state field 624 displays the connection state of a meeting room terminal 90 with respect to the meeting management server 30. The connection state includes "connected", "disconnected", "connection refused", and "after setup" as described below. The connection state corresponds to communication settings for the meeting room terminal 90 associated with a meeting room.

In the "connected" state, the meeting room terminal 90 has requested the reservation information in the past 3 minutes. The meeting room terminal 90 requests the reservation information once every 30 seconds.

In the "disconnected" state, the meeting room terminal 90 has not requested the reservation information for more than the past 3 minutes. The meeting room terminal 90 requests the reservation information once every 30 seconds.

In the "connection refused" state, the meeting room terminal 90 has started communication with the meeting management server 30, but the meeting management server 30 refuses to transmit the reservation information (the association between the meeting room terminal 90 and the meeting room remains enabled).

In the "after setup (waiting for connection)" state, the meeting room terminal 90 has not started communication with the meeting management server 30 (that is, the initial settings are completed, but the meeting room terminal 90 has not requested the reservation information). The meeting management server 30 waits for a request for the reservation information from the meeting room terminal 90. In response to receiving the request, the meeting management server 30 transmits the reservation information to the meeting room terminal 90.

The last accessed time field 625 indicates the date and time when the meeting room terminal 90 last accessed (communicated with) the meeting management server 30 to request the reservation information. The edit field 626 displays an icon for the administrator to edit the connection state. When an icon in the edit field 626 is pressed, a pull-down menu is displayed to allow the administrator to select the connection state, as illustrated in FIG. 10B. In order to display the pull-down menu illustrated in FIG. 10B, the installed terminals list screen 620 may transition to the pull-down menu illustrated in FIG. 10B, or the pull-down menu illustrated in FIG. 10B may be displayed on the installed terminals list screen 620.

FIG. 10B illustrates example connection states that can be selected by the administrator. The connection states that can be selected by the administrator are displayed in the pull-down menu. The connection states "after setup", "connection refused", and "delete" can be selected by the administrator. The connection states "connected" and "disconnected" are automatically set, and unable to be set by the administrator.

When the administrator selects "delete" from the pull-down menu, all information related to the meeting room terminal 90 is deleted from the meeting room setting information DB 498. Therefore, the association between the deleted meeting room terminal 90 and the meeting room is removed, and the meeting room terminal 90 is removed from the installed terminals list screen 620. After the meeting room terminal 90 is deleted, the meeting room terminal 90 is no longer present in the meeting management sever 30.

When the connection state of the meeting room terminal 90 is set to "connection refused", information related to the meeting room terminal 90 remains in the meeting room setting information DB 498. Therefore, when the administrator changes the connection state of the meeting room terminal 90 to "after setup" from the installed terminals list screen 620, the meeting room terminal 90 can be installed in a meeting room without the initial settings. Accordingly, "connection refused" is effective in temporarily stopping the use of the meeting room terminal 90. When the connection state of the meeting room terminal 90 is set to "delete", the administrator is required to register information related to the meeting room terminal 90 in the meeting room setting information DB 498 again. Thus, selecting "delete" is effective when the meeting room terminal 90 is lost or when the administrator desires to associate the meeting room terminal 90 with another meeting room.

As described above, in the present embodiment, the administrator can select the "connection refused" state on the web page. Accordingly, in a case where a plurality of meeting room terminals are installed in a meeting room, communication settings for only a malfunctioning meeting room terminal can be disabled. Further, even if an information processing terminal is lost, the possibility of information leakage can be reduced.

In the following, when a plurality of meeting room terminals 90 are associated with one meeting room, the necessity of setting the connection state of one meeting room terminal 90 to "connection refused" will be described. One of the conditions for automatic reservation cancellation is that "all meeting room terminals 90 associated with a meeting room are being connected". With this condition, automatic cancellation can be avoided when the user is unable to check in due to a malfunction or a communication failure of one of the meeting room terminals 90. When one of the meeting room terminals 90 malfunctions, the malfunctioning meeting room terminal 90 is disconnected, thereby causing automatic cancellation to be disabled. Accordingly, by setting the connection state of the malfunctioning meeting room terminal 90 to "connection refused", automatic cancellation can be enabled.

Next, an example of displaying an image code will be described. When the administrator presses an icon in the image code field 506, the operation receiving unit 52 of the registration terminal 50 receives the pressing of the icon, and the registration terminal 50 requests an image code from the meeting management server 30. Accordingly, the communication unit 51 receives the image code including communication setting information.

FIG. 11 illustrates the meeting room management screen 501 on which the image code is superimposed.

As illustrated in FIG. 11, the display control unit 53 of the registration terminal 50 displays the image code on the meeting room management screen 501 in a popup window. The name of a meeting room and a meeting room ID may be displayed together with the image code. Accordingly, the administrator can understand for which meeting room the initial settings are to be configured.

The image code may be displayed as a separate web page, instead of being displayed in a popup window. Alternatively, the image code may be downloaded as a file. The administrator captures the image code with a meeting room terminal 90 for which the initial settings are to be configured.

<Example of Connection State Transitions>

Figure 12:
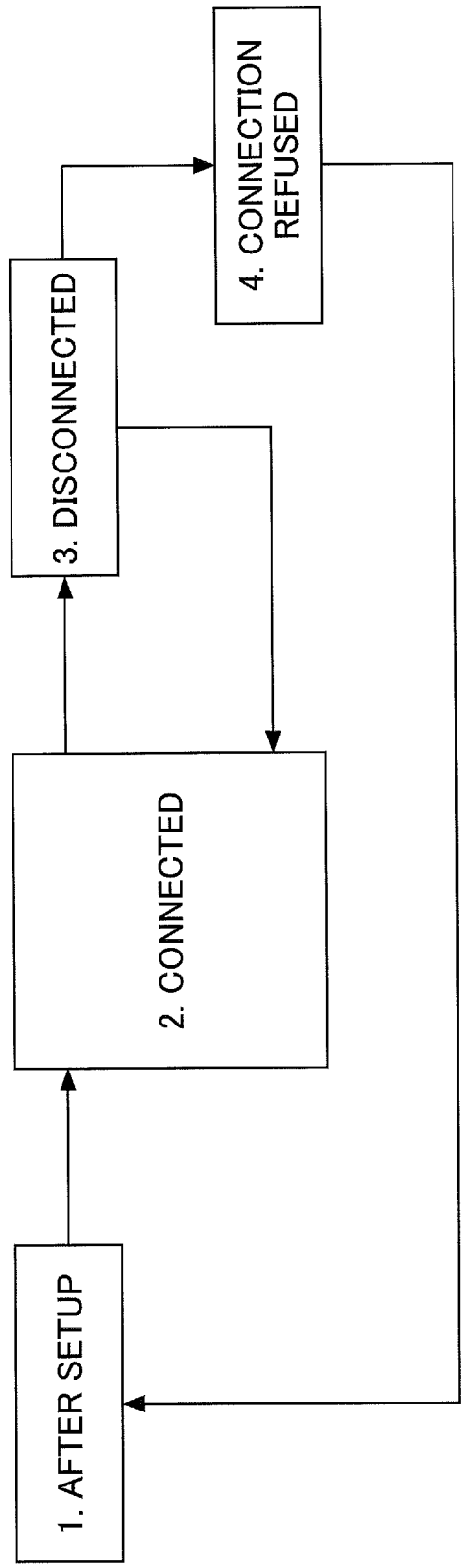
FIG. 12 is a diagram illustrating state transitions of the meeting room terminal.

FIG. 12 is a diagram illustrating state transitions of a meeting room terminal 90. As described above, the connection states include "after setup", "connected", "disconnected", and "connection refused". Further, the conditions for the state transitions are as follows.

Transition from "after setup" to "connected": The meeting room terminal 90 starts communication to request reservation information.

Transition from "connected" to "disconnected": 3 minutes has elapsed since the meeting room terminal 90 last accessed.

Transition from "disconnected" to "connected": The meeting room terminal 90 has started to request the reservation information again.

Transition from "disconnected" to "connection refused": The administrator has set the connection state of the meeting room terminal 90 to "connection refused".

Transition from "connection refused" to "after setup": The administrator has set the connection state of the meeting room terminal 90 to "after setup".

<Screen Transitions of Meeting Room Terminal>

Next, referring to FIGS. 13A through 13G, screens displayed by the terminal application of the meeting room terminal 90 at the initial settings will be described. FIGS. 13A through 13G are examples of screens displayed by the terminal application of the meeting room terminal 90.

Figure 13A:
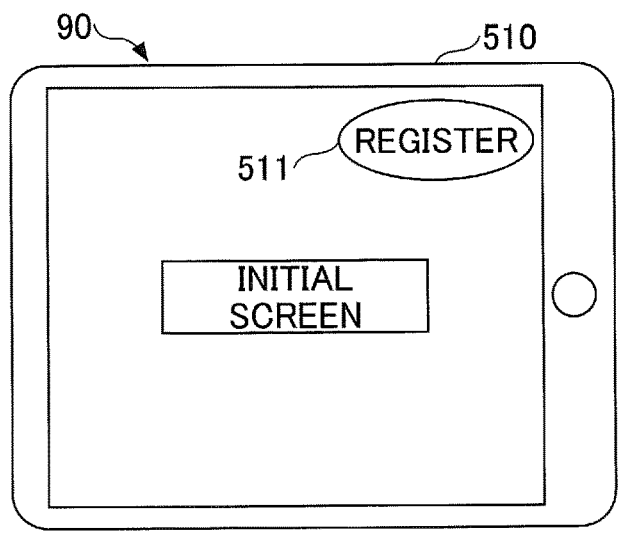
FIGS. 13A through 13G are examples of screens displayed by a terminal application of the meeting room terminal.

First, an initial screen 510 illustrated in FIG. 13A is displayed when the administrator starts the terminal application of the meeting room terminal 90. The initial screen 510 includes a Register button 511. When the administrator presses the Register button 511, the operation receiving unit 93 receives the pressing of the Register button 511. The Register button 511 is a button for registering the meeting room terminal 90 in the meeting management server 30.

Figure 13B:
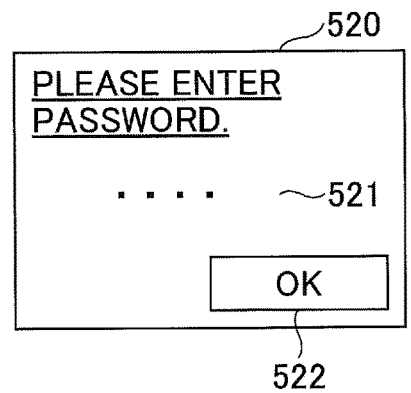

In response to the pressing of the Register button 511, the display control unit 94 of the meeting room terminal 90 displays a password input screen 520 as illustrated in FIG. 13B. The password input screen 520 includes a password input field 521 and an OK button 522. The administrator enters the administrator password in the password input field 521, and presses the OK button. The operation receiving unit 93 receives the administrator's operation. The terminal authentication unit 96 compares the entered administrator password with the administrator password stored in the storage unit 99, and determines whether the authentication is successful or unsuccessful. In this manner, it is possible to prevent a user from changing the settings for the meeting room terminal 90 installed in a meeting room where any users can enter.

Figure 13C:
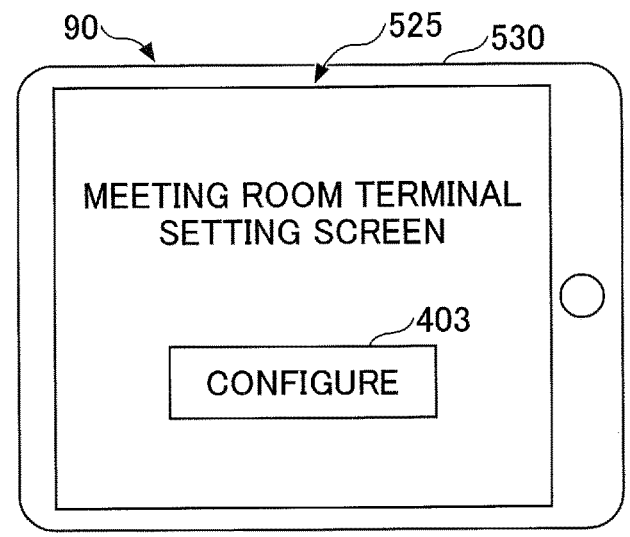
Figure 13D:
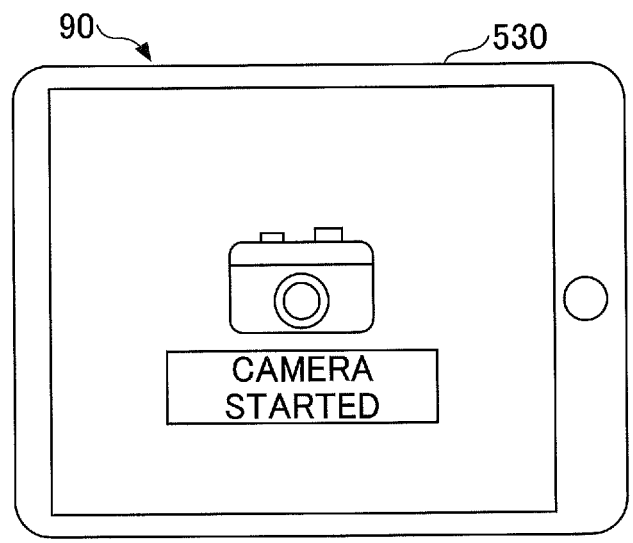

When the authentication using the administrator password is successful, a meeting room terminal setting screen 525 is displayed as illustrated in FIG. 13C. When the administrator presses a Configure button 403, which will be described below, the imaging unit 97 of the meeting room terminal 90 starts as illustrated in FIG. 13D. FIG. 13D indicates a camera started screen 530. When the administrator operates the meeting room terminal 90 such that the image code illustrated in FIG. 11 is within the angle of view of the CMOS sensor 713, the imaging unit 97 captures the image code.

Figure 13E:
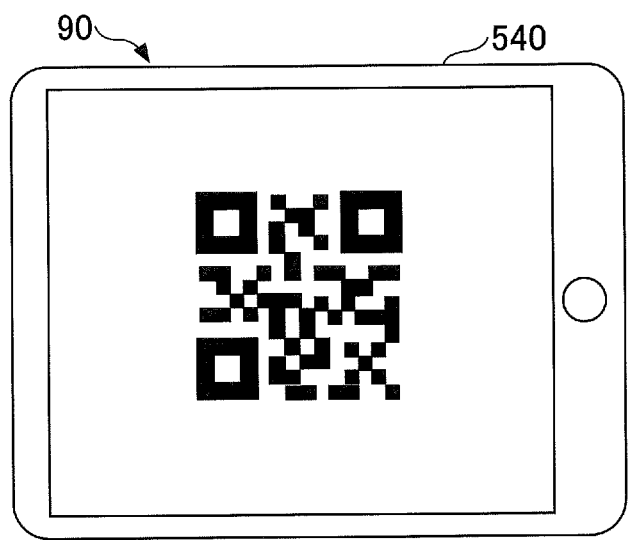

The display control unit 94 of the meeting room terminal 90 displays the image code, captured as illustrated in FIG. 13E, on the display 718 (an example of a display unit) as a video, such that the administrator can readily operate the meeting room terminal 90 while the image is being captured. FIG. 13E illustrates a capturing screen 540. The decoding unit 98 decodes the captured image code to restore communication setting information.

Figure 13F:
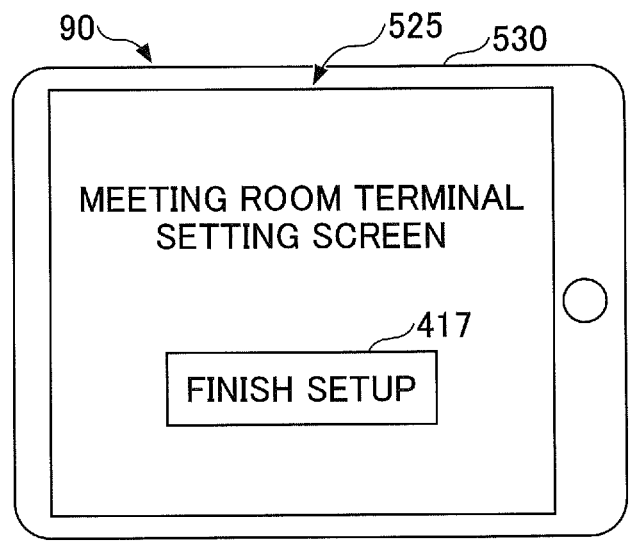

When the communication setting information is restored by decoding the image code, the meeting room terminal setting screen 525 is displayed again as illustrated in FIG. 13F. The name of a meeting room included in the communication setting information is automatically displayed on the meeting room terminal setting screen 525. When the administrator presses a Finish Setup button 417, the meeting room terminal 90 starts to acquire reservation information. When the Finish Setup button 417 is pressed, a standby screen without reservation information is displayed.

The server communication unit 91 of the meeting room terminal 90 can use the communication setting information to communicate with the meeting management server 30. The meeting room terminal 90 can acquire reservation information after the authentication using the authentication key is successful, and the operation state is set to "operating".

Figure 13G:
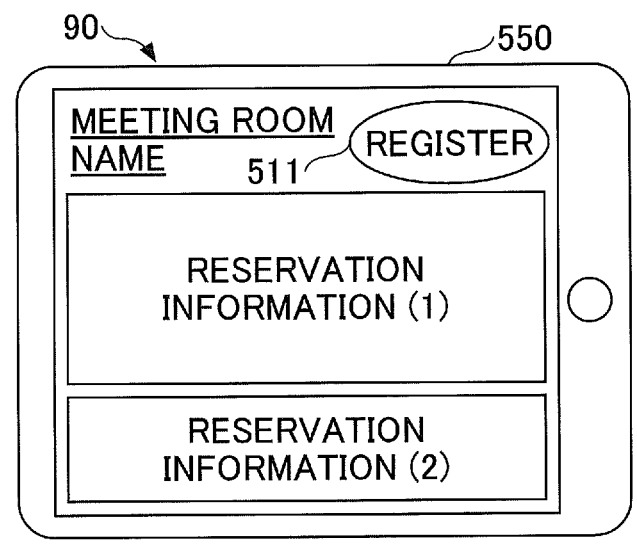

As described above, when the initial settings for the meeting room terminal 90 is completed, and the operation state of the meeting room terminal 90 is set to "operating", the meeting room terminal 90 starts to download reservation information. FIG. 13G illustrates a display screen (standby screen) 550 of the downloaded reservation information. An example of the standby screen will be described with reference to FIG. 18 through FIG. 20.

<Procedure for Initial Settings>

Next, referring to FIG. 14, a procedure for the administrator to configure the initial settings of a meeting room terminal 90 will be described. FIG. 14 is a sequence diagram illustrating an example of a procedure for configuring the initial settings for a meeting room terminal 90. Note that the terminal application has been installed on the meeting room terminal 90. In addition, a login screen for logging in to the meeting management server 30 is assumed to be displayed on the registration terminal 50.

In S1, the reservation information acquiring unit 33 transmits, to the reservation management server 20, a request for a list of resources at a predetermined frequency. Requesting the list of resources means requesting a list of customer resources registered in the reservation management server 20. In the resource reservation system 100, meeting rooms are regarded as resources. Therefore, by requesting the list of resources, the meeting management server 30 can acquire the list of meeting rooms to be displayed on the meeting room management screen 501. The predetermined frequency may be a low frequency such as once a day. The resources include electronic devices 70 in addition to the meeting rooms.

In S2, the reservation information acquiring unit 33 of the meeting management server 30 repeatedly requests reservation information from the reservation management server 20. Requesting reservation information means requesting reservation information by specifying an account of a user who made the reservation. Accordingly, the meeting management server 30 can acquire the reservation information for a predetermined period of time. The reservation information acquiring unit 33 preferably requests the reservation information at a relatively high frequency such as every 30 seconds or every one hour. In addition, reservation information that has been changed or newly registered may be automatically transmitted from the reservation management server 20.

In S3, the administrator logs in to the registration terminal 50. That is, the administrator enters a login password and a user ID. The operation receiving unit 52 of the registration terminal 50 receives the login operation.

In S4, the communication unit 51 of the registration terminal 50 transmits a login request (the login password and the user ID) to the meeting management server 30. Note that the login request may be transmitted to an authentication server, instead of the meeting management server 30.

In S5, the authentication unit 40 of the meeting management server 30 performs authentication by determining whether the login password and the user ID are the same as those stored in the login information DB 499. In the present embodiment, the authentication is assumed to be successful. The communication unit 31 of the meeting management server 30 transmits an authentication result to the registration terminal 50.

In S6, the administrator performs an operation for displaying the list of resources on the registration terminal 50. Displaying the list of resources means displaying the meeting room management screen 501 as illustrated in FIG. 9A. The operation receiving unit 52 of the registration terminal 50 receives the operation for displaying the list of resources. Note that the meeting room management screen 501 may be automatically displayed in response to the successful authentication. Further, because the administrator has logged in, the customer ID of a customer, for which the initial settings for the meeting room terminal 90 are to be configured by the administrator, is identified.

In S7, the communication unit 51 of the registration terminal 50 transmits a request for the list of resources to the meeting management server 30.

In S8, the communication unit 31 of the meeting management server 30 receives the request for the list of resources. Then, the setting screen generating unit 391 acquires meeting room setting information from the setting information DB 498 based on the customer ID, and generates the meeting room management screen 501 that displays the list of meeting rooms (resources) of the customer. Note that the resources include electronic devices 70 in addition to the meeting rooms. The communication unit 31 of the meeting management server 30 transmits screen information of the meeting room management screen 501 to the registration terminal 50.

In S9, the communication unit 51 of the registration terminal 50 receives the screen information of the meeting room management screen 501, and the display control unit 53 displays the meeting room management screen 501 as illustrated in FIG. 9A.

In S10, next, the administrator selects a meeting room, and performs an operation for displaying an image code. That is, the administrator presses an icon in the image code field 506. The operation receiving unit 52 of the registration terminal 50 receives the operation for displaying the image code.

In S11, the communication unit 51 of the registration terminal 50 transmits a request to display the image code to the meeting management server 30 by specifying a meeting room ID.

In S12, the communication unit 31 of the meeting management server 30 receives the request to display the image code. First, the information management unit 395 acquires communication setting information from the storage unit 49. Specifically, the information management unit 395 acquires a server URL associated with the customer ID from the login information DB 499. Further, the information management unit 395 acquires a meeting room name and an authentication key, associated with the meeting room ID transmitted from the registration terminal 50, from the meeting room setting information DB 498. The authentication key may be generated for the meeting room terminal 90 by the authentication key generating unit 392 at this point. The encryption unit 393 encrypts the above communication setting information.

In S13, the image code generating unit 394 encodes the communication setting information into an image code. As described above, the meeting management server 30 provides the communication setting information when the communication setting information is requested.

In S14, the communication unit 31 of the meeting management server 30 transmits the image code to the registration terminal 50.

In S15, the communication unit 51 of the registration terminal 50 receives the image code, and displays the image code on the display 718 as illustrated in FIG. 11.

In S16, the administrator presses the Register button 511 on the meeting room terminal 90, and enters an administrator password. That is, the administrator presses the Register button 511 on the initial screen 510 illustrated in FIG. 13A, and enters an administrator password in the password input screen 520. The operation receiving unit 93 of the meeting room terminal 90 receives the administrator's operation.

In S17, if the administrator password entered by the administrator matches the administrator password stored in the storage unit 99, the terminal authentication unit 96 of the meeting room terminal 90 determines that the authentication has succeeded. If the administrator password entered by the administrator does not match the administrator password stored in the storage unit 99, the meeting room terminal 90 determines that the authentication has failed.

In S18, when the authentication has succeeded, the administrator starts a camera by pressing the Configure button 403 on the meeting room terminal setting screen 525 as illustrated in FIG. 13C.

In S19, as illustrated in FIG. 13D, the imaging unit 97 of the meeting room terminal 90 is started.

In S20, when the administrator operates the meeting room terminal 90 such that the image code is within the angle of view of the CMOS sensor 713, the imaging unit 97 captures the image code and automatically generates image data.

In S21, the decoding unit 98 decodes the image code captured by the imaging unit 97 to restore the communication setting information. Then, the meeting room terminal setting screen 525 is displayed again as illustrated in FIG. 13F.

In S22, the setting storage unit 98-2 stores the communication setting information in the storage unit 99. Accordingly, the meeting room ID, the server URL, the authentication key, and the meeting room name are stored in the storage unit 99, thus enabling communication with the meeting management server 30. When the operation state is set to "operating", the meeting room terminal 90 can acquire the reservation information. It is necessary that information related to the meeting room terminal 90 is not deleted, and the connection state of the meeting room terminal 90 is not set to "connection refused". As described, when the communication setting information is stored, the meeting room terminal 90 automatically starts communication with the meeting management server 30.

<<Connection Refused Setting>>

Figure 15:
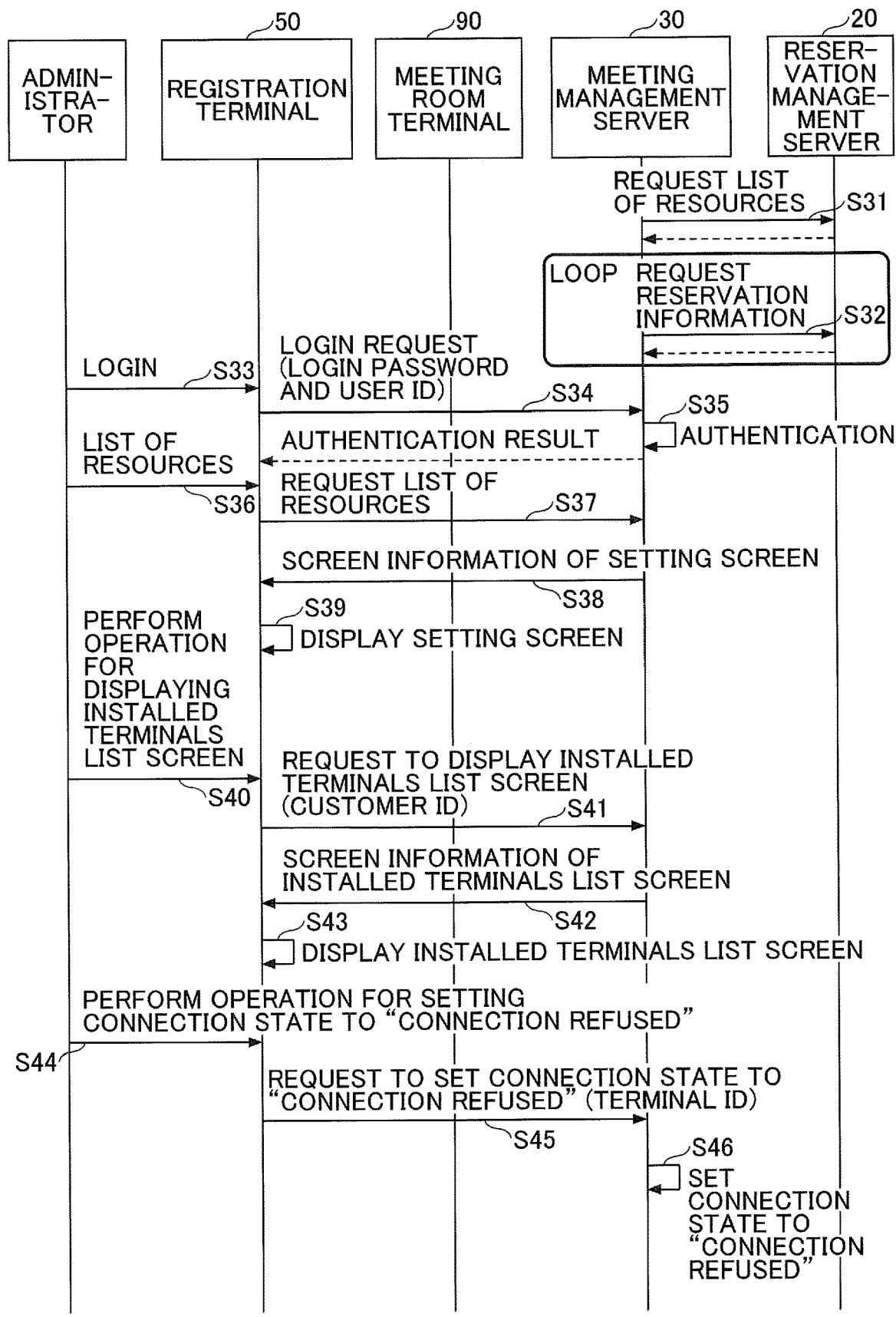
FIG. 15 is a sequence diagram illustrating an example of a procedure for setting the connection state of the meeting room terminal to "connection refused" in the resource reservation system.

Next, referring to FIG. 15, a procedure for the administrator to set the connection state of a meeting room terminal 90 to "connection refused" will be described. FIG. 15 is a sequence diagram illustrating an example of a procedure for setting the connection state of a meeting room terminal 90 to "connection refused" in the resource reservation system 100. Steps S31 to S39 of FIG. 15 may be the same as steps S1 to S9 of FIG. 14.

In S40, the administrator performs an operation for displaying the installed terminals list screen 620 on the registration terminal 50. That is, the administrator presses the List of Installed Terminals button 509. The operation receiving unit 52 of the registration terminal 50 receives the pressing of the List of Installed Terminals button 509.

In S41, the communication unit 51 of the registration terminal 50 specifies a customer ID, and transmits a request to display the installed terminals list screen 620 to the meeting management server 30.

In S42, the communication unit 31 of the meeting management server 30 receives the request to display the installed terminals list screen 620. The setting screen generating unit 391 acquires meeting room setting information from the meeting room setting information DB 498 based on the customer ID, and generates the installed terminals list screen 620 that displays the connection states. The communication unit 31 of the meeting management server 30 transmits screen information of the installed terminals list screen 620 to the registration terminal 50.

In S43, the communication unit 51 of the registration terminal 50 receives the screen information of the installed terminals list screen 620, and the display control unit 53 displays the installed terminals list screen 620 as illustrated in FIG. 10A.

In S44, the administrator selects a terminal ID of a meeting room terminal 90, and performs an operation for setting the connection state of the meeting room terminal 90 to "connection refused". The operation receiving unit 52 of the registration terminal 50 receives the operation for setting the connection state to "connection refused".

In S45, the communication unit 51 of the registration terminal 50 specifies the terminal ID selected by the administrator, and transmits a request to set the connection state to "connection refused" to the meeting management server 30.

In S46, the communication unit 31 of the meeting management server 30 receives the request to set the connection state to "connection refused". Then, the setting receiving unit 396 refers to the meeting room setting information DB 498, and sets the connection state of the meeting room terminal 90 corresponding to the terminal ID to "connection refused" through the information management unit 395.

Accordingly, the administrator can set the connection state of any meeting room terminal 90 to "connection refused". In addition, the administrator can delete any meeting room terminal 90 registered in the meeting room setting information DB 498 in a similar manner.

<<Acquiring Reservation Information, Starting to Work with Meeting Management Server, and Starting to Manage Meeting Room>>

Figure 16:
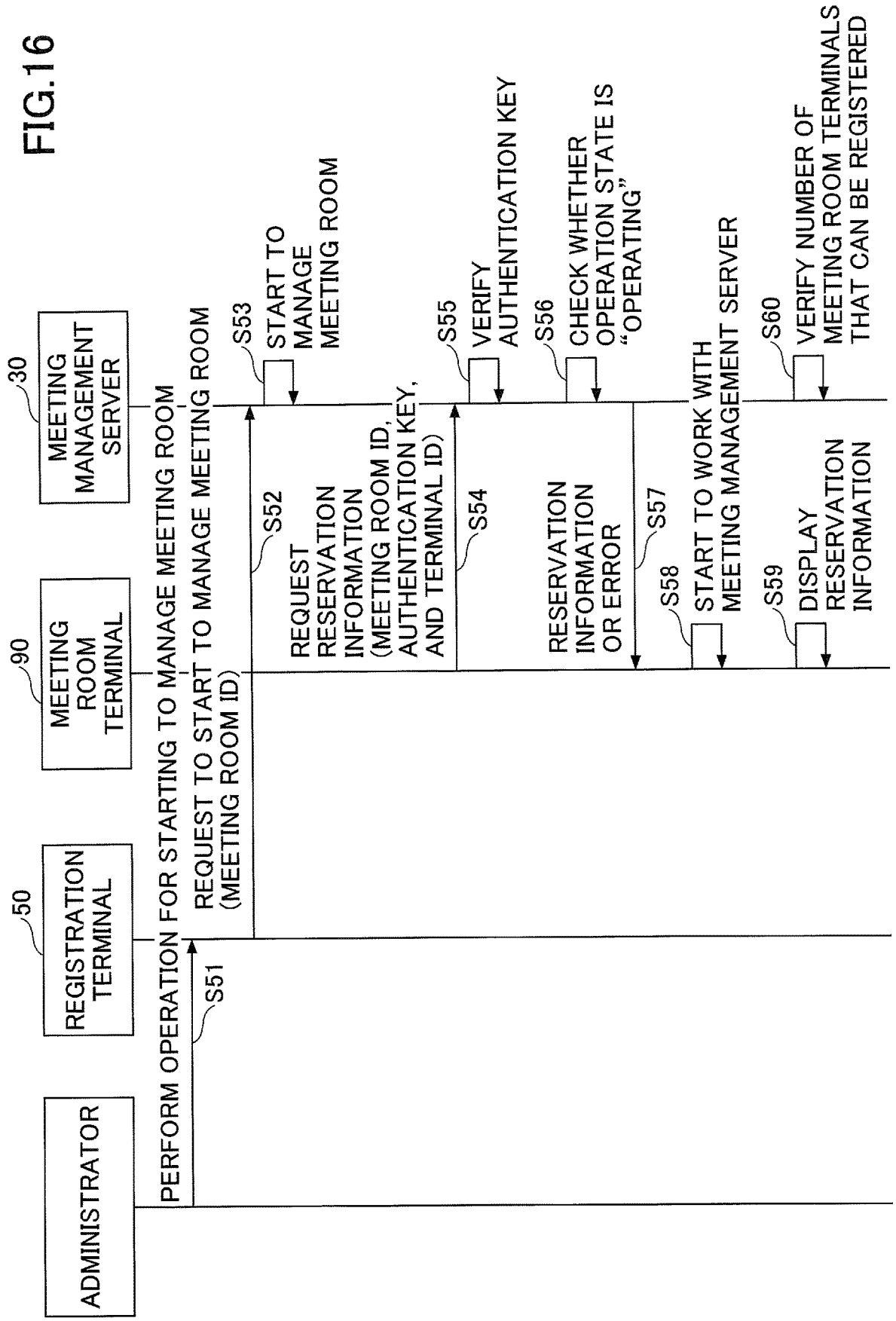
FIG. 16 is a sequence diagram illustrating an example of a process for the meeting room terminal to acquire reservation information.

Next, referring to FIG. 16, a process for a meeting room terminal 90 to acquire reservation information will be described. FIG. 16 is a sequence diagram illustrating an example of a process for a meeting room terminal 90 to acquire reservation information. Note that it is assumed that the meeting room management screen 501 is displayed.

In S51, the administrator sets the operation state of a meeting room to "operating" on the meeting room management screen 501. The above operation corresponds to an operation for starting to manage the meeting room (in practical use, the management of the meeting room is started by requesting reservation information). The operation receiving unit 52 of the registration terminal 50 receives the above operation.

In S52, the communication unit 51 of the registration terminal 50 transmits a request to set the operation state of the meeting room to "operating" and to start to manage the meeting room, to the meeting management server 30 by specifying a meeting room ID.

In S53, the communication unit 31 of the meeting management server 30 receives the request to start to manage meeting room. The setting receiving unit 396 sets the operation state of meeting room setting information, identified based on the meeting room ID, to "operating" through the information management unit 395. Then, the meeting management server 30 can start transmitting reservation information to the meeting room terminal 90 in response to receiving a request, as long as the connection state of the meeting room terminal 90 is not set to "connection refused". If information related to the meeting room terminal 90 is deleted, an error occurs.

In S54, the reservation information requesting unit 98-3 of the meeting room terminal 90 periodically communicates with the meeting management server 30 through the server communication unit 91. That is, the reservation information requesting unit 98-3 of the meeting room terminal 90 transmits a request for reservation information (every 30 seconds, for example) by specifying the meeting room ID and an authentication key, with a server URL as a destination. In order to identify the meeting room, the meeting room ID may be required, and a terminal ID is not required to be transmitted to the meeting management server 30. However, the terminal ID may be transmitted to the meeting management server 30 such that the meeting management server 30 can identify the number of meeting room terminals 90 that can be registered.

In order for the reservation information requesting unit 98-3 to continuously acquire reservation information, the reservation information requesting unit 98-3 may transmit a request for reservation information to the meeting management server 30 at predetermined intervals. Alternatively, when reservation information is changed, the meeting management server 30 may send a notification to the meeting room terminal 90, indicating that the reservation information is changed, and only when the notification is received, the meeting room terminal 90 may request the reservation information from the meeting management server 30. Any method may be employed as long as the meeting room terminal 90 can acquire changes in reservation information.

In S55, the communication unit 31 of the meeting management server 30 receives the request for reservation information, and determines whether information related to the meeting room terminal 90, which is identified based on the meeting room ID, is registered in the meeting room setting information DB 498. When it is determined that information related to the meeting room terminal 90 is registered, the authentication key verifying unit 41 verifies the authentication key. That is, the authentication key verifying unit 41 obtains authentication key from the meeting room setting information DB 498 based on the meeting room ID, and determines whether the authentication key obtained from the meeting room setting information DB 498 matches the authentication key transmitted from the meeting room terminal 90. When it is determined that the two authentication keys match, the initial setting unit 39 changes the connection state of the meeting room terminal 90 to "connected" in the meeting room setting information DB 498.

In S56, when the two authentication keys match, the management/control unit 42 checks whether the operation state of the meeting room is "operating" and whether the meeting room terminal 90 has requested the reservation information. That is, the management/control unit 42 acquires the operation state of the meeting room from the meeting room setting information DB 498 based on the meeting room ID, and determines whether the operation state is "operating". When the meeting room terminal 90 has requested the reservation information from the meeting management server 30 even once (in addition, the authentication keys match), and the operation state is "operating", the management/control unit 42 starts to manage the meeting room.

Accordingly, the reservation information transmitting unit 44 of the meeting management server 30 transmits the reservation information. However, if the connection state is "connection refused", the reservation information transmitting unit 44 does not transmit the reservation information. When the operation state is "operating", the meeting room management service is started. Therefore, in a case where a check-in is not detected, a reservation for the meeting room is automatically cancelled.

When the authentication keys match, but the operation state is "stopped", the management/control unit 42 does not start to manage the meeting room. In this case, the reservation information transmitting unit 44 does not transmit the reservation information. However, even when the management of the meeting room is not started, the reservation information requesting unit 98-3 of the meeting room terminal 90 continues to request the reservation information. Because the meeting management server 30 is located in the external network, it is difficult for the meeting management server 30 to access the meeting room terminal 90 to indicate that the management of the meeting room is started (a management start flag is set to "true"). Therefore, it is preferable for the meeting room terminal 90 to continue to communicate with the meeting management server 30.

In S57, the reservation information transmitting unit 44 of the meeting management server 30 transmits the reservation information or an error (if the authentication keys do not match, the operation state is "stopped", or the connection state is "connection refused") to the meeting room terminal 90 through the communication unit 31. When it is determined that the authentication keys match, the operation state is "operating", and the connection state is not "connection refused", the reservation information transmitting unit 44 transmits the reservation information to the meeting room terminal 90.

In S58, the server communication unit 91 of the meeting room terminal 90 receives the reservation information or the error. When the meeting room terminal 90 receives the reservation information, the meeting room terminal 90 starts to work with the meeting management server 30. If the authentication keys do not match, the operation state is "stopped", or the connection state is "connection refused", the meeting room terminal 90 receives the error. In this case, the meeting room terminal 90 does not start to work with the meeting management server 30.

As described above, when the operation state is set to "operating" and a request for reservation information is detected, the management of the meeting room is started and the meeting room terminal 90 starts to work with the meeting management server 30. In other words, when the initial settings for the meeting room terminal 90 are completed and the meeting room terminal 90 is installed in the meeting room, the management of the meeting room can be started, and the meeting room terminal 90 can start to work with the meeting management server 30. If it is determined that only a request for reservation information is detected, inconvenience caused by automatic cancellation as described above would occur. If it is determined that only the operation state is set to "operating", and the initial settings for the meeting room terminal 90 are not completed, a reservation would be automatically cancelled.

In addition, when the connection state is set to "connection refused", the meeting management server 30 can refuse to transmit the reservation information while providing the meeting room management service.

In S59, when the reservation information requesting unit 98-3 of the meeting room terminal 90 receives the reservation information, the display control unit 94 displays the reservation information. When the reservation information requesting unit 98-3 of the meeting room terminal 90 receives the error, the display control unit 94 displays a message indicating that the reservation information is unable to be displayed and the reasons why the reservation information is not displayed.

In S60, because the terminal ID is transmitted together with the authentication key, the terminal ID verifying unit 43 of the meeting management server 30 can determine whether the number of meeting room terminals 90 associated with the meeting room exceeds a predetermined number.

<<Conditions for Meeting Management Server to Transmit Reservation Information to Meeting Room Terminal>>

Figure 17:
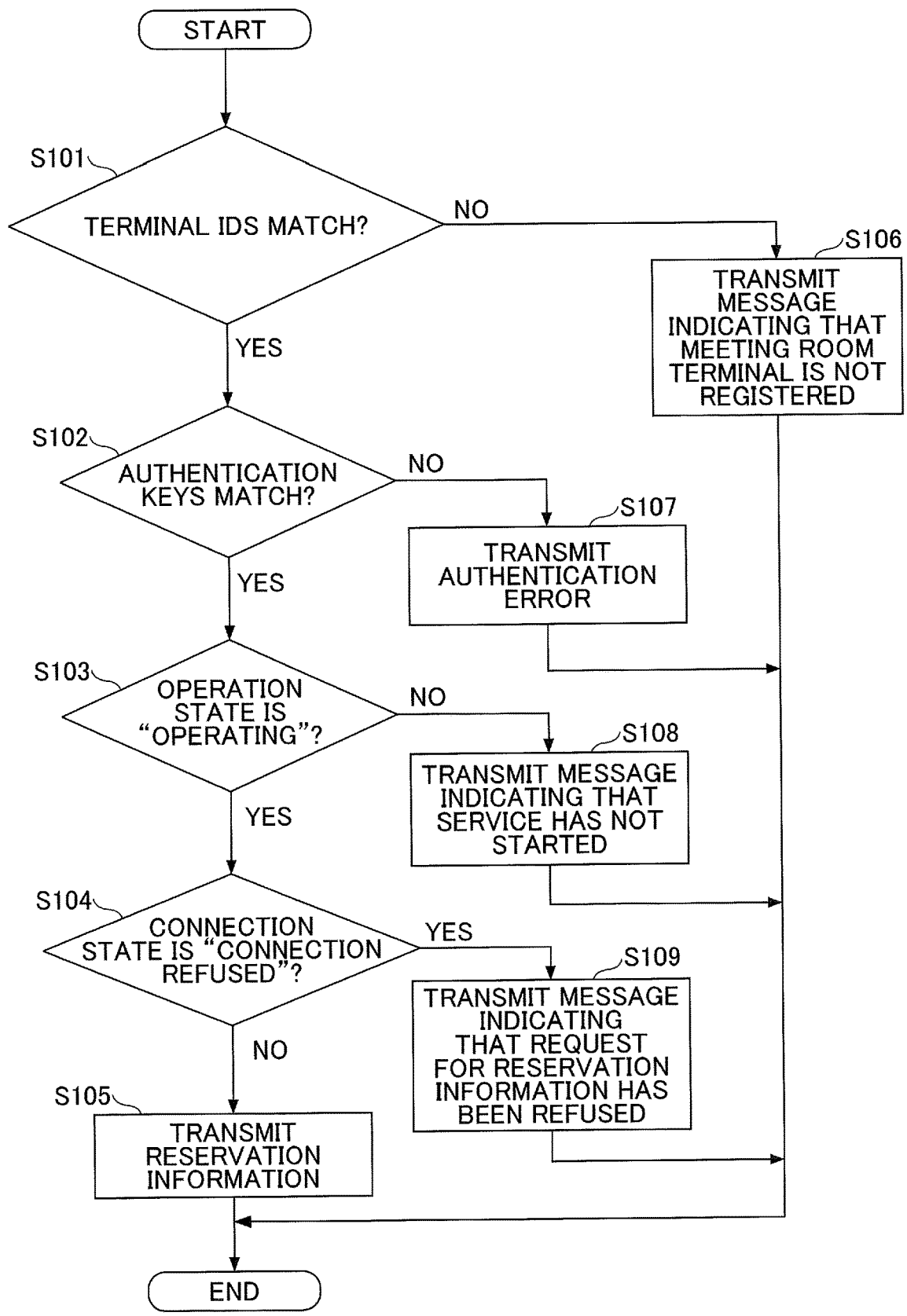
FIG. 17 is a flowchart illustrating conditions for the meeting management server to transmit reservation information to the meeting room terminal.

Conditions for the meeting management server 30 to transmit reservation information to a meeting room terminal 90 will be described. FIG. 17 is an example of a flowchart illustrating conditions for the meeting management server 30 to transmit reservation information to a meeting room terminal 90. The meeting management server 30 determines whether each condition as illustrated in FIG. 17 is satisfied in response to receiving a request for reservation information with a terminal ID and an authentication key.

First, the management/control unit 42 determines whether the terminal ID of the meeting room terminal 90 matches a terminal ID registered in the meeting room setting information DB 498 (S101). When it is determined that the terminal ID does not match the terminal ID registered in the meeting room setting information DB 498, there is a possibility that the meeting room terminal 90 has been deleted on the installed terminals list screen 620. Because the initial settings have been configured for the meeting room terminal 90, communication setting information is stored in the meeting room terminal 90, and thus, the meeting room terminal 90 can communicate with the meeting management server 30.

When it is determined that the terminal ID does not match the terminal ID registered in the meeting room setting information DB 498 (no in step S101), the reservation information transmitting unit 44 transmits a message, indicating that the meeting room terminal 90 is not registered, to the meeting room terminal 90 (S106).

When it is determined that the terminal ID matches the terminal ID registered in the meeting room setting information DB 498 (yes in step S101), the authentication key verifying unit 41 determines whether the authentication key received from the meeting room terminal 90 matches an authentication key stored in the meeting room setting information DB 498 as described above (S102).

When the authentication keys do not match (no in step S102), the reservation information transmitting unit 44 of the meeting management server 30 transmits an authentication error to the meeting room terminal 90 (S107).

When the authentication keys match (yes in step S102), the management/control unit 42 determines whether the operation state is "operating" as described above (S103). When the operation state is "operating", the meeting room management service has already started.

When the operation state is not "operating" (no in step S103), the reservation information transmitting unit 44 of the meeting management server 30 transmits a message, indicating that the service has not started, to the meeting room terminal 90 (S108).

When the operation state is "operating" (yes in step S103), the management/control unit 42 determines whether the connection state is "connection refused" as described above (S104).

When the connection state is "connection refused" (yes in step S104), the reservation information transmitting unit 44 of the meeting management server 30 sends a message, indicating that the request for reservation information has been refused, to the meeting room terminal 90 (S109).

When the connection state is not "connection refused" (no in step S104), the reservation information transmitting unit 44 transmits the reservation information (S105).

<Examples of Reservation Information Displayed by Meeting Room Terminal>

Figure 18:
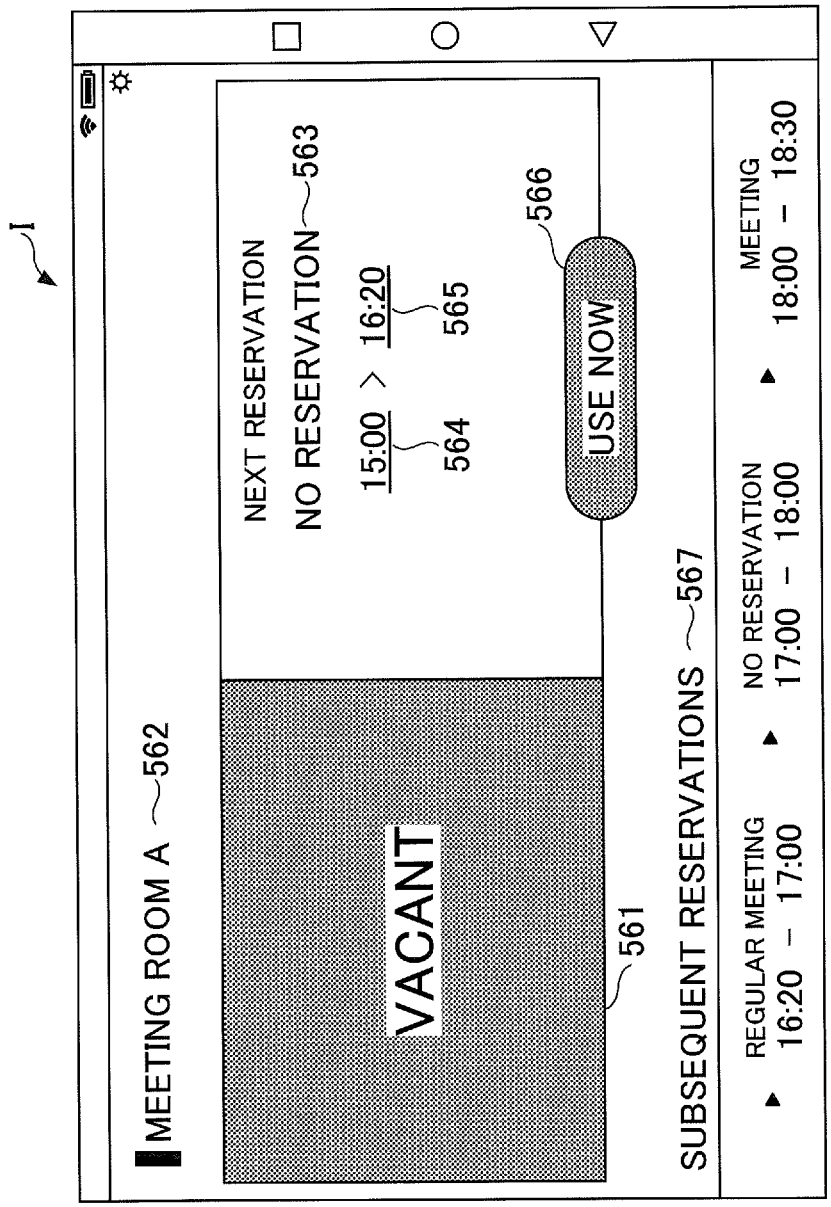
FIG. 18 is a diagram illustrating an example of a standby screen I displayed by the meeting room terminal when a meeting room is currently vacant.
Figure 19:
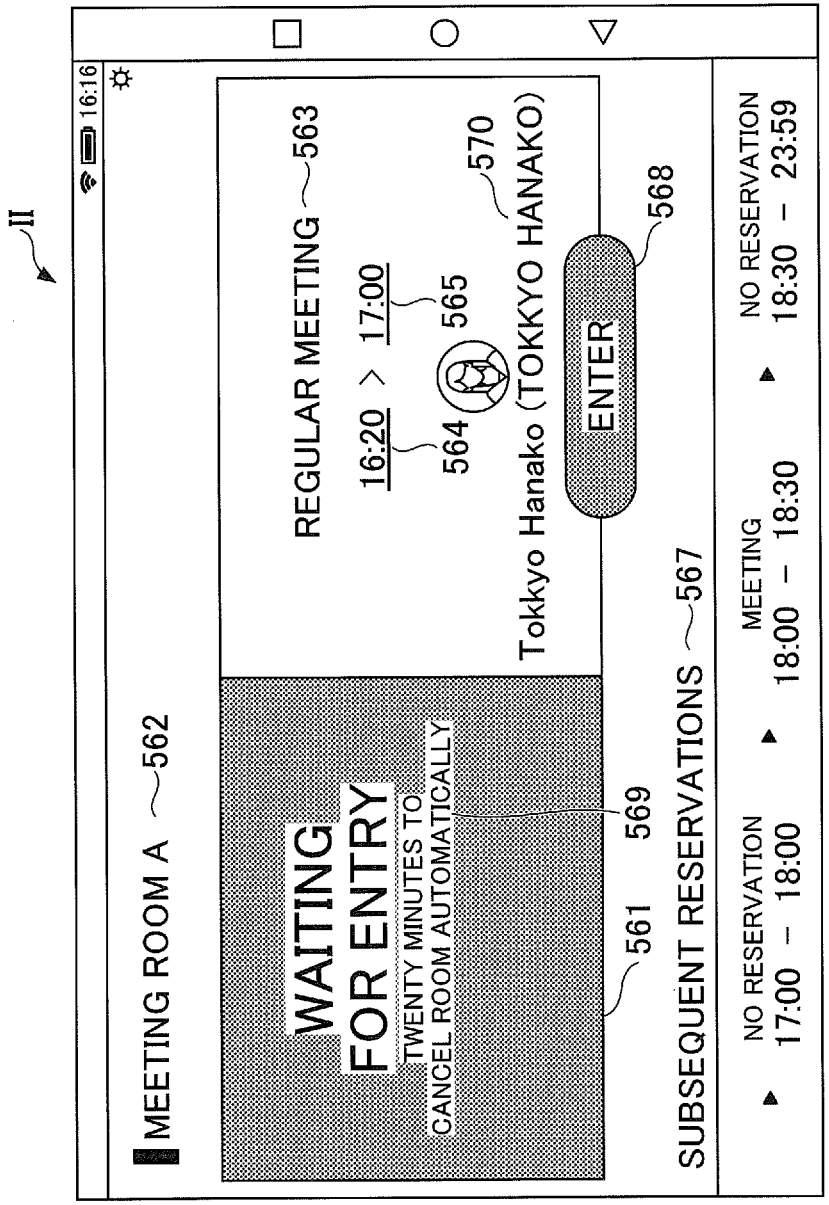
FIG. 19 is a diagram illustrating an example of a standby screen II displayed by the meeting room terminal when the meeting room is currently vacant and the start time of the next meeting is within a predetermined period of time.
Figure 20:
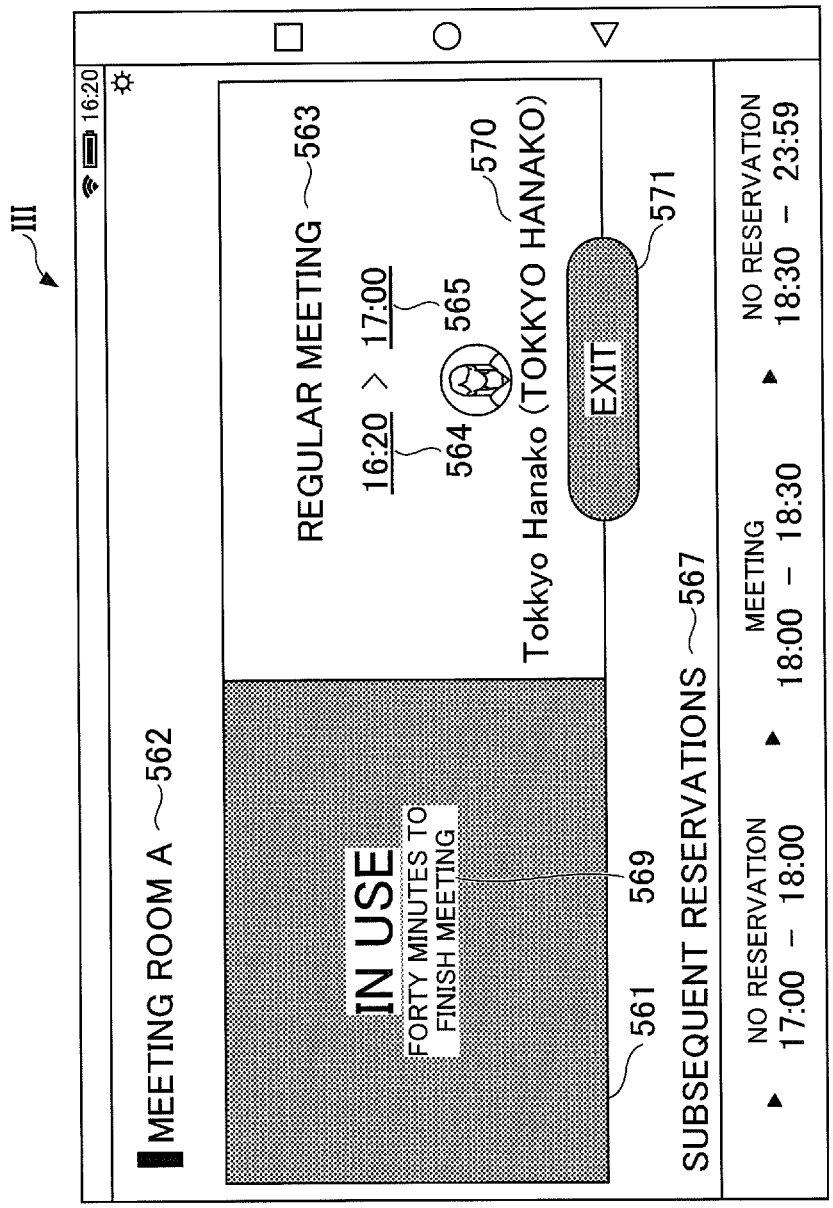
FIG. 20 is a diagram illustrating an example of a standby screen III displayed by the meeting room terminal when the meeting room is currently in use.

Referring to FIG. 18 through FIG. 20, reservation information displayed by a meeting room terminal 90 will be described. FIG. 18 illustrates an example of a standby screen I displayed by the meeting room terminal 90 when a meeting room is currently vacant. The standby screen I of FIG. 18 displays a current status field 561, a meeting room name field 562, a meeting name field 563, a start time field 564, an end time field 565, a Use Now button 566, and a subsequent reservation field 567.

The current status field 561 indicates the current status of the meeting room. The display control unit 94 displays the status of reservation information in the current status field 561. If there is no reservation information at the current time, the display control unit 94 displays "vacant" (until check-in for the next reservation becomes possible) or "waiting for entry" (after check-in for the next reservation becomes possible).

The meeting room name stored in the storage unit 99 is displayed in the meeting room name field 562. The meeting name included in the reservation information is displayed in the meeting name field 563. Until check-in for the next reservation becomes possible, the display control unit 94 displays "No Reservation" in the meeting name field 563.

The start time and the end time included in the reservation information are displayed in the start time field 564 and the end time field 565, respectively. When there is no reservation, the standby screen is displayed as illustrated in FIG. 18. In this case, the end time of the last meeting and the start time of the next meeting are displayed in the start time field 564 and the end time field 565, respectively.

The subsequent reservation field 567 displays the start time and end time of each meeting reserved after the current time in accordance with the reservation information. The Use Now button 566 is displayed when the current status field 561 indicates "vacant". The user can start using the meeting room by pressing the Use Now button 566 without a reservation for the meeting room. The pressing of the button is transmitted to the meeting management server 30 and the reservation management server 20, and the status of the meeting room in the reservation information is changed. The change in the status of the meeting room is also applied to the standby screen in response to the reception of the reservation information by the meeting room terminal 90.

FIG. 19 illustrates an example of a standby screen II displayed by the meeting room terminal 90 when the meeting room is currently vacant, and the start time of the next meeting is within a predetermined period of time. The standby screen II of FIG. 19 displays "waiting for entry" in the current status field 561, and an Enter button 568. In addition, the name of a user who reserved the meeting room is displayed in a user name field 570. When the status of the reservation information is changed to "check-in possible" or the like, the display control unit 94 displays "waiting for entry", and also displays the Enter button 568.

For example, the status of the reservation information may be changed to "check-in possible" ten minutes before the start time, and the display control unit 94 may display "waiting for entry" and enable check-in. That is, the user who reserved the meeting room can check in. If the meeting room terminal 90 does not transmit a check-in request by a predetermined time, the check-in management unit 38 of the meeting management server 30 determines that check-in is not detected and automatically cancels the reservation. Therefore, the display control unit 94 counts down the time 569 until the reservation is automatically cancelled, and displays the countdown in the current status field 561. For example, the reservation may be automatically cancelled ten minutes after the start time.

The Enter button 568 is a button for the user to check in. By pressing the Enter button 568, the user who reserved the meeting room can enter meeting identification information. Information on the user who reserved the meeting room is displayed in the user name field 570. An account included in the reservation information, or the name or the nickname of the user who reserved the meeting room may be transmitted from the meeting management server 30. Further, a picture of the user who reserved the meeting room or a character representing the user who reserved the meeting room may be displayed.

FIG. 20 illustrates an example of a standby screen III displayed by the meeting room terminal 90 when the meeting room is currently in use. The standby screen III of FIG. 20 displays "in use" in the current status field 561, and an Exit button 571. When the user who reserved the meeting room checks in, the status of the meeting room in the meeting management information DB 493 becomes "checked-in". The display control unit 94 detects that the status becomes "checked-in" in response to the reception of the reservation information by the meeting room terminal 90. The display control unit 94 displays "in use" in the current status field 561 and the Exit button 571 until the user checks out. Further, the display control unit 94 counts down the time until the end time, and displays the countdown in the current status field 561. The Exit button 571 is a button for the user who reserved the meeting room to check out.

When the Exit button 571 is pressed, a check-out request is transmitted to the meeting management server 30, and the check-in management unit 38 of the meeting management server 30 updates the status of the meeting room in the meeting management information DB 493 to "checked-out". The display control unit 94 displays "vacant" or "waiting for entry" in the current status field 561 in response to the reception of the reservation information by the meeting room terminal 90.

Note that the information displayed in FIG. 18 through FIG. 20 may be generated by the meeting management server 30, instead of being generated by the meeting room terminal 90 based on the reservation information. In this case, the meeting room terminal 90 executes browser software, thereby allowing the meeting management server 30 to control the entire standby screen of the meeting room terminal 90.

<<Connection Error Screen Displayed when Connection State is Connection Refused>>

Figure 21:
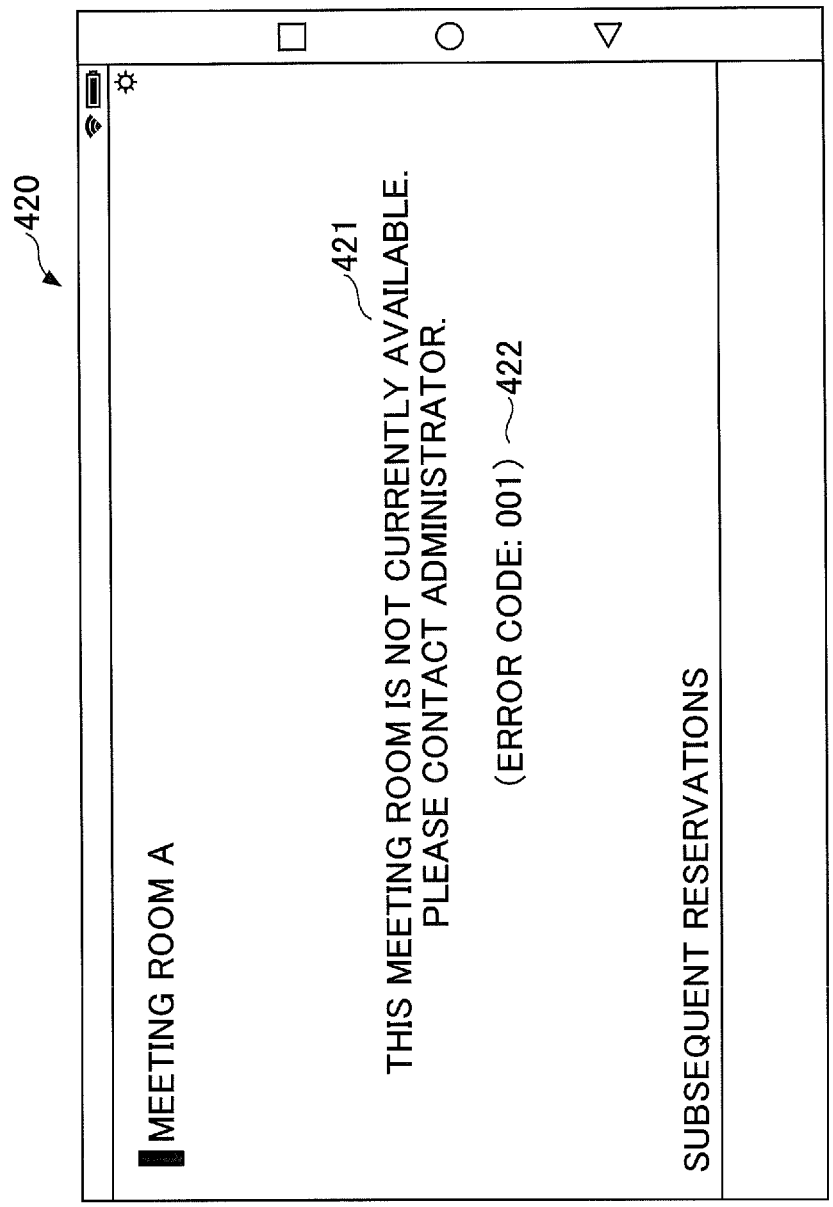
FIG. 21 is a diagram illustrating an example of a connection error screen displayed when a meeting room terminal, whose connection state is set to "connection refused" in a meeting room setting information DB, has requested reservation information.

FIG. 21 is a diagram illustrating an example of a connection error screen 420 displayed when a meeting room terminal 90, whose connection state is set to "connection refused" in the meeting room setting information DB 498, has requested reservation information. The connection error screen 420 of FIG. 21 displays a message 421 that "This meeting room is not currently available. Please contact the administrator", and also an error code 422. The message 421 indicates that the request for reservation information has been refused. Accordingly, when the connection state is "connection refused", the meeting room terminal 90 does not display the standby screen, thereby preventing information leakage.

<<Registration Error Screen Displayed when Meeting Room Terminal, which has been Deleted on Installed Terminals List Screen, has Communicated with Meeting Management Server>>

Figure 22:
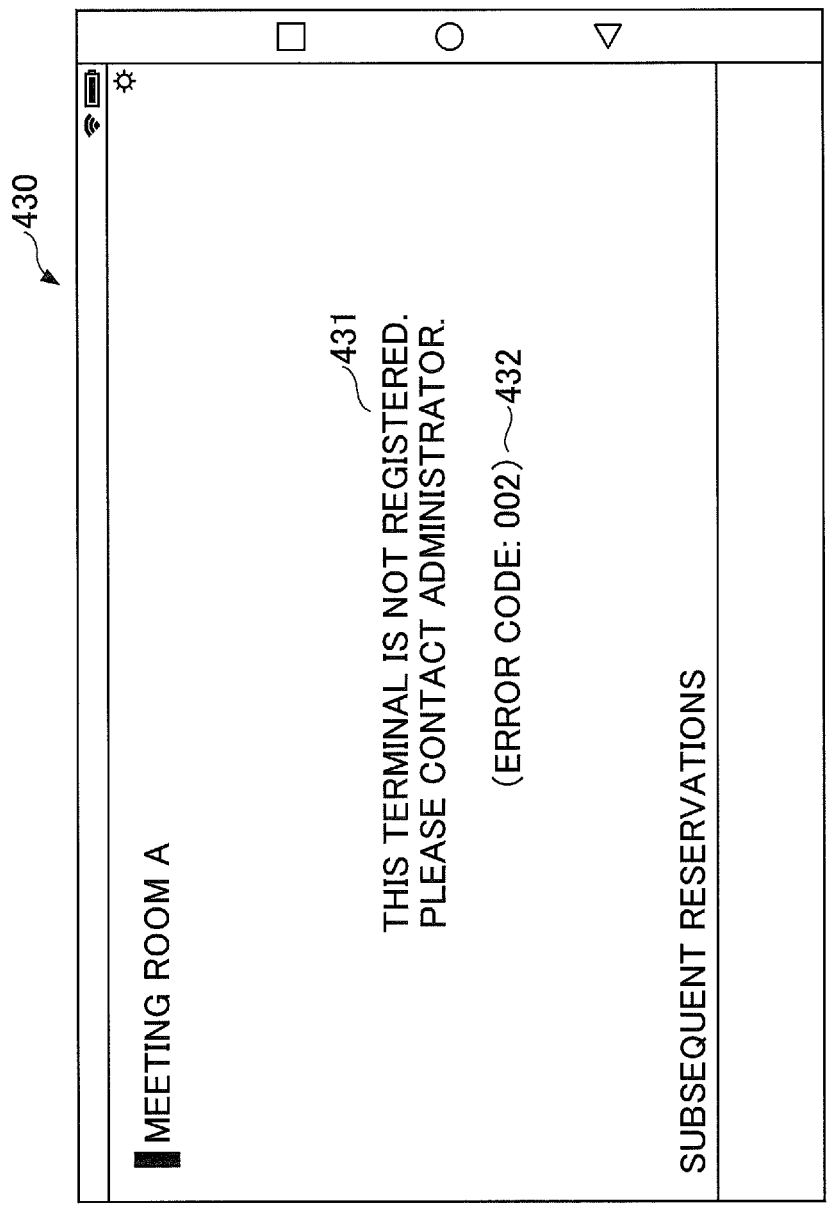
FIG. 22 is a diagram illustrating an example of a registration error screen displayed when a meeting room terminal, which has been deleted on the installed terminals list screen, has requested reservation information.

FIG. 22 is a diagram illustrating an example of a registration error screen 430 displayed when a meeting room terminal 90, which has been deleted on the installed terminals list screen 620, requested reservation information. The registration error screen 430 of FIG. 22 displays a message 431 that "This terminal is not registered. Please contact the administrator", and also an error code 432. Accordingly, when information related to the meeting room terminal 90 has been deleted from the meeting management server 30, the message indicating that the meeting room terminal 90 is not registered is displayed. Thus, the administrator can understand that the initial settings are required to be configured for the meeting management server 30 again.

The message displayed when the connection state is set to "connection refused", as illustrated in FIG. 21, differs from the message display when information related to the meeting room terminal 90 has been deleted, as illustrated in FIG. 22. Therefore, the user or the administrator can readily understand the situation.

<Application Example of Present Embodiment>

An application example of the present embodiment will be described. When a meeting room terminal 90 malfunctions, there may be a case where the malfunctioning meeting room terminal 90 is replaced with a new meeting room terminal 90. In this case, a customer engineer (CE) brings the new meeting room terminal 90 to the customer's location where there is a meeting room, and installs a terminal application 90a on the new meeting room terminal 90.

Next, the CE contacts the administrator. The administrator configures communication setting information for the new meeting room terminal 90, and sets the connection state to "after setup", by a method using an image code as described in the above embodiment, by a method using a bidirectional communication apparatus, or by a manual setting method. When the bidirectional communication apparatus is used, the registration terminal 50 acquires the communication setting information from the malfunctioning meeting room terminal 90 via the bidirectional communication apparatus, and sets the same communication setting information for the new meeting room terminal 90. If it is difficult to acquire the communication setting information from the malfunctioning meeting room terminal 90, the administrator manually sets the communication setting information for the meeting room terminal 90. In this case, the administrator can refer to the meeting room management screen 501 to acquire the communication setting information of the malfunctioning meeting room terminal 90.

Further, the administrator sets the connection state of the malfunctioning meeting room terminal 90 to "connection refused", or deletes the malfunctioning meeting room terminal 90 from the meeting room setting information DB 498, such that the meeting management server 30 and the malfunctioning meeting room terminal 90 no longer communicate with each other. Accordingly, the malfunctioning meeting room terminal 90 can be readily replaced. For example, if the "connection refused" state and the "delete" state are unable to be set, the administrator would be required to turn off the meeting room terminal 90 or uninstall the terminal application 90a such that the meeting management server 30 does not transmit reservation information to the meeting room terminal 90. In addition, if the meeting room terminal 90 is lost, turning off the meeting room terminal 90 or uninstalling the terminal application 90a would be difficult.

It may be contemplated that the operation state is set to "stopped". However, if the operation state is set to "stopped", the meeting room management service would become unavailable to all meeting room terminals 90 associated with the meeting room.

<Other Applications>

Although the embodiments have been specifically described above, the present invention is not limited to the above-described embodiments. Variations and modifications may be made to the described subject matter without departing from the scope of the invention as set forth in the accompanying claims.

There may be a plurality of meeting management servers 30. Alternatively, the functions of the meeting management server 30 may be divided and allocated to a plurality of servers. The reservation management server 20 and the meeting management server 30 may be integrated.

The resource reservation system 100 of the above-described embodiment may also be referred to as a web service. The web service includes a variety of services provided by applying an Internet-related technology. Examples of the web service include a meeting room rental service and other rental services. A system that uses the web service is referred to as a utilization system.

In addition, the functional configuration of the resource reservation system 100 are divided into the functional blocks as illustrated in FIG. 6 and FIG. 7 based on the main functions, in order to facilitate the understanding of processes performed by the resource reservation system 100. However, the present invention is not limited by how processing units are divided or by the names of processing units. The resource reservation system 100 may be divided into more processing units according to the process. Further, one processing unit can be divided to include a larger number of processes.

The functions of the embodiments described above may be implemented by one or more processing circuits. As used herein, the "processing circuit" includes a processor programmed to cause software to execute the functions, such as a processor implemented by electronic circuitry, and an application-specific integrated circuit (ASIC), a digital signal processor (DSP), a field-programmable gate array (FPGA), and a circuit module designed to execute the above-described functions.

What is claimed is:

1. A resource reservation system comprising:
an information processing apparatus configured to manage reservation information of a resource; and
an information processing terminal configured to acquire the reservation information from the information processing apparatus,
the information processing terminal including
a first memory, and
a first processor coupled to the first memory and configured to
transmit a request for the reservation information of the resource to the information processing apparatus, and
display the reservation information received from the information processing apparatus, and
the information processing apparatus including
a second memory, and
a second processor coupled to the second memory and configured to
transmit the reservation information of the resource to the information processing terminal, in response to the request from the information processing terminal,
store, in the second memory, a communication setting of the information processing terminal with respect to the information processing apparatus, the information processing terminal being associated with the resource,
generate a first web page that displays the communication setting of the information processing terminal, the first web page being displayed by a registration terminal, and
receive a change in the communication setting of the information processing terminal, the change in the communication setting being made on the first web page displayed by the registration terminal, wherein
the second processor switches whether to transmit the reservation information in accordance with the communication setting of the information processing terminal, in response to the request from the information processing terminal,
the first web page displays a connection refusal state in which transmission of the reservation information is refused, and a deletion state in which information related to the information processing terminal associated with the resource is deleted from the second memory, the connection refusal state and the deletion state being enabled for selection on the first web page, and
the second processor receives the connection refusal state or the deletion state as the change in the communication setting of the information processing terminal.

2. The resource reservation system according to claim 1, wherein the second processor transmits a first message to the information processing terminal in response to the request for the reservation information from the information processing terminal after the communication setting of the information processing terminal is set to the connection refusal state, and the second processor transmits a second message to the information processing terminal in response to the request for the reservation information from the information processing terminal after the information related to the information processing terminal is deleted from the second memory, the first message being different from the second message.

3. The resource reservation system according to claim 1, wherein the first web page displays the connection refusal state, the deletion state, and a post-setup state in which communication with the information processing apparatus is not started, the connection refusal state, the deletion state, and the post-setup state being enabled for selection on the first web page, and
the second processor changes the communication setting of the information processing terminal to a connected state, in which the transmission of the reservation information is permitted, in response to the request for the reservation information from the information processing terminal after the registration terminal receives a change from the connection refusal state to the post-setup state, and the second processor receives the post-setup state as the change in the communication setting of the information processing terminal.

4. The resource reservation system according to claim 1, wherein the second memory stores communication settings of a plurality of respective information processing terminals associated with one resource,
the registration terminal receives changes in communication settings of the plurality of respective information processing terminals associated with one resource, and
the second processor receives the changes in the communication settings of the plurality of respective information processing terminals from the registration terminal.

5. The resource reservation system according to claim 4, wherein the second processor generates a second web page that displays an operating state in which a service related to the resource is operating, and a stopped state in which the service related to the resource is stopped, the second web page being displayed by the registration terminal,
receives either the operating state or the stopped state, the operating state or the stopped state being selected on the second web page displayed by the registration terminal,
determines to not transmit the reservation information in a case where the service related to the resource is in the operating state, and a communication setting of a given information processing terminal of the plurality of the information processing terminals associated with the one resource is set to the connection refusal state, and
determines to transmit the reservation information in a case where the service related to the resource is in the operating state, and the communication setting of the given information processing terminal is set to the connected state.

6. The resource reservation system according to claim 1, wherein the resource is a meeting room.

7. A registration terminal for communication with an information processing apparatus via a network, the information processing apparatus including a first memory and being configured to switch whether to transmit reservation information in accordance with a communication setting of an information processing terminal in response to a request from the information processing terminal, the registration terminal comprising:

a second memory; and a processor coupled to the second memory and configured to receive a first web page that displays the communication setting of the information processing terminal, the communication setting being stored in the first memory of the information processing apparatus, display the received first web page, receive a change in the communication setting of the information processing terminal on the displayed first web page, and transmit the change in the communication setting of the information processing terminal to the information processing apparatus wherein the first web page displays a connection refusal state in which transmission of the reservation information is refused, and a deletion state in which information related to the information processing terminal associated with the resource is deleted from the second memory, the connection refusal state and the deletion state being enabled for selection on the first web page, and the connection refusal state or the deletion state is received as the change in the communication setting of the information processing terminal.

8. A setting method performed by a registration terminal for communication with an information processing apparatus via a network, the information processing apparatus including a memory and being configured to switch whether to transmit reservation information in accordance with a communication setting of an information processing terminal in response to a request from the information processing terminal, the setting method comprising:

receiving a first web page that displays the communication setting of the information processing terminal, the communication setting being stored, in the memory of the information processing apparatus, displaying the received first web page, receiving a change in the communication setting of the information processing terminal on the displayed first web page, and transmitting the change in the communication setting of the information processing terminal to the information processing apparatus, wherein the first web page displays, a connection refusal state in which transmission of the reservation information is refused, and a deletion state in which information related to the information processing terminal associated with the resource is deleted from the second memory, the connection refusal state and the deletion state being enabled for selection on the first web page, and the connection refusal state or the deletion state is received as the change in the communication setting of the information processing terminal.

* * * * *